US011797752B1

(12) United States Patent
Xu et al.

(10) Patent No.: US 11,797,752 B1
(45) Date of Patent: Oct. 24, 2023

(54) IDENTIFYING DOWNLOADABLE OBJECTS IN MARKUP LANGUAGE

(71) Applicant: Dropbox, Inc., San Francisco, CA (US)

(72) Inventors: Tony Xu, Redmond, WA (US); ChokSheak Lau, Kenmore, WA (US); Yi Zhang, Redmond, WA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/807,947

(22) Filed: Jun. 21, 2022

(51) Int. Cl.
| | |
|---|---|
| *G06F 40/143* | (2020.01) |
| *G06F 9/451* | (2018.01) |
| *G06F 16/957* | (2019.01) |
| *G06F 40/134* | (2020.01) |
| *G06F 3/14* | (2006.01) |
| *G06F 40/258* | (2020.01) |
| *G06F 40/205* | (2020.01) |

(52) U.S. Cl.
CPC .............. *G06F 40/143* (2020.01); *G06F 3/14* (2013.01); *G06F 9/451* (2018.02); *G06F 16/957* (2019.01); *G06F 40/134* (2020.01); *G06F 40/205* (2020.01); *G06F 40/258* (2020.01)

(58) Field of Classification Search
CPC ...... G06F 40/143; G06F 9/451; G06F 16/957; G06F 40/134; G06F 40/205; G06F 40/258
See application file for complete search history.

(56) References Cited

U.S. PATENT DOCUMENTS

| | | | |
|---|---|---|---|
| 8,087,080 B1 * | 12/2011 | Wan .................. | G06F 21/51 726/25 |
| 9,195,775 B2 * | 11/2015 | Al-Shaykh .......... | G06F 16/9577 |
| 11,256,775 B1 | 2/2022 | Lepeska et al. | |
| 2005/0132083 A1 * | 6/2005 | Raciborski ............ | H04L 63/123 709/232 |
| 2007/0050386 A1 | 3/2007 | Busey | |
| 2008/0301280 A1 * | 12/2008 | Chasen ................... | H04L 67/02 709/224 |
| 2009/0077471 A1 * | 3/2009 | Lahr ...................... | G06F 16/958 715/748 |
| 2010/0057884 A1 * | 3/2010 | Brownell ........... | H04N 7/17318 709/227 |
| 2010/0070628 A1 * | 3/2010 | Harrang ................. | H04L 47/12 709/224 |
| 2010/0325615 A1 | 12/2010 | Ramot | |
| 2011/0289108 A1 | 11/2011 | Bhandari et al. | |
| 2011/0321160 A1 * | 12/2011 | Mohandas .......... | H04L 63/1416 726/22 |
| 2014/0053064 A1 * | 2/2014 | Weber ................. | G06F 16/9574 715/234 |
| 2014/0280696 A1 * | 9/2014 | Veeramani .......... | H04L 67/1097 709/217 |

(Continued)

FOREIGN PATENT DOCUMENTS

| | | | | |
|---|---|---|---|---|
| WO | | 0109738 A1 | 2/2001 | |
| WO | WO-2015188431 A1 * | 12/2015 | ............. | G06F 16/00 |

Primary Examiner — Asher D Kells
(74) Attorney, Agent, or Firm — Polsinelli PC

(57) ABSTRACT

The present technology provides a browser extension that can recognize downloadable objects on a webpage and provides functionality that makes it easier and more efficient to download the downloadable objects to a location in a content management system. For example the present technology can analyze a document object model of a webpage to find attributes indicating a URL is associated with a downloadable object.

19 Claims, 12 Drawing Sheets

(56) References Cited

U.S. PATENT DOCUMENTS

| | | | |
|---|---|---|---|
| 2015/0193108 A1* | 7/2015 | Li | G06F 40/131 |
| | | | 715/748 |
| 2016/0048485 A1* | 2/2016 | Sherwood | H04M 1/72445 |
| | | | 715/234 |
| 2016/0248839 A1* | 8/2016 | Quintero | H04L 67/1097 |
| 2017/0011133 A1* | 1/2017 | Shalunov | G06F 16/986 |
| 2017/0132669 A1* | 5/2017 | Cao | G06F 16/00 |
| 2018/0121399 A1* | 5/2018 | Callaghan | H04L 67/535 |
| 2018/0217964 A1 | 8/2018 | Lin et al. | |
| 2020/0252413 A1 | 8/2020 | Buzbee et al. | |

\* cited by examiner

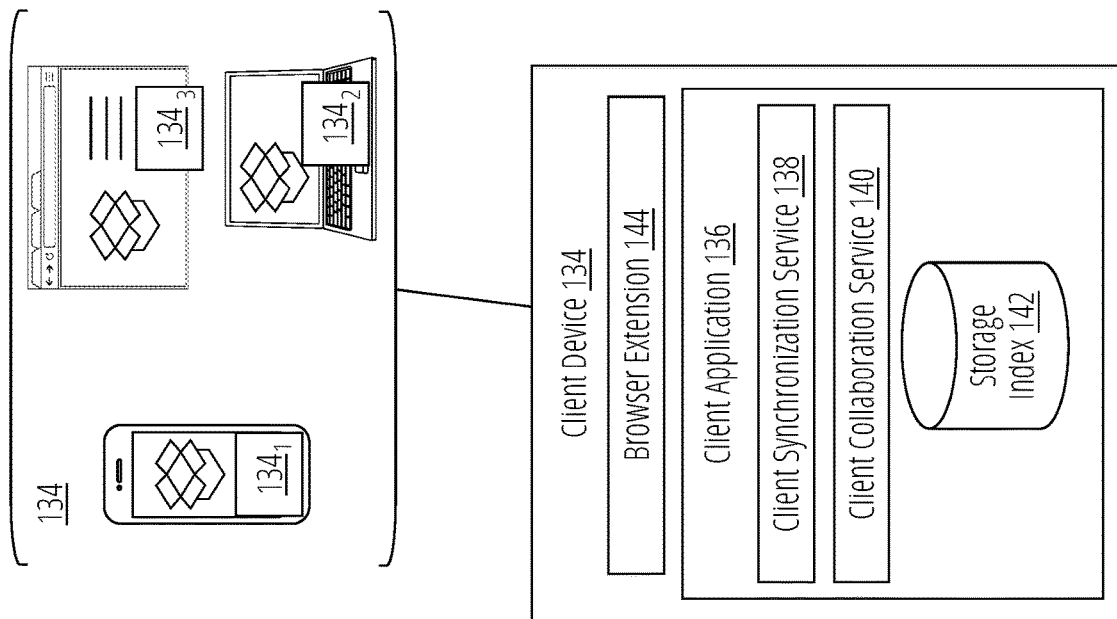
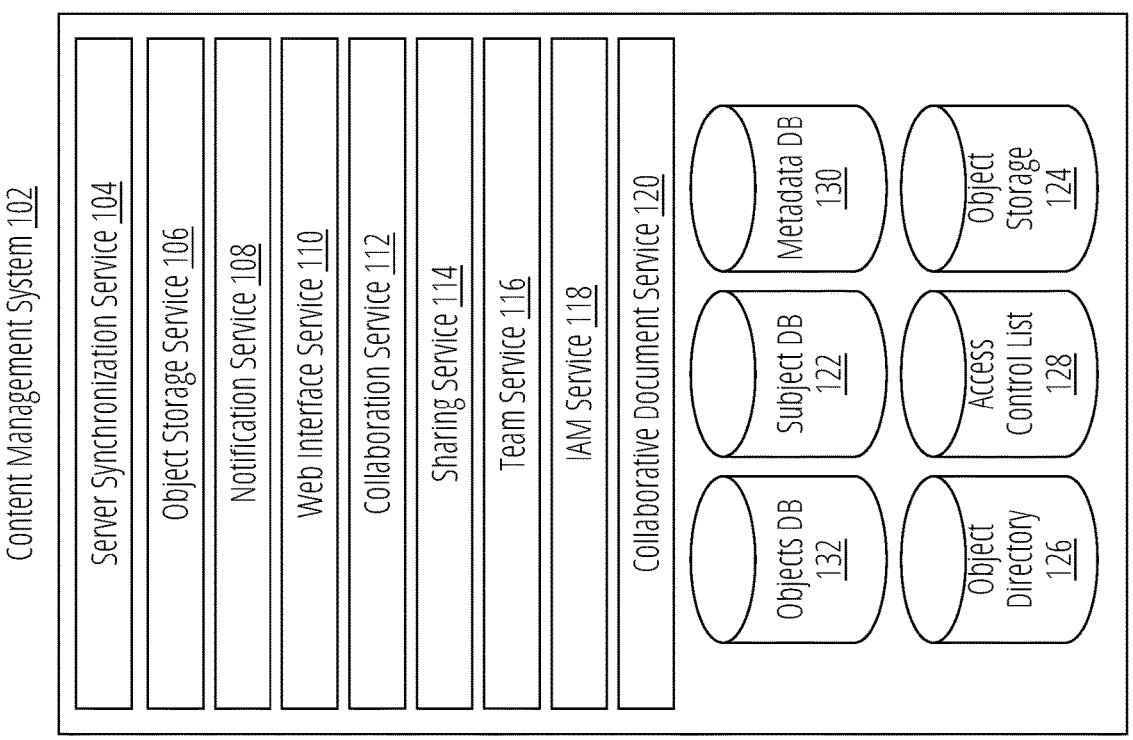
FIG. 1

| | | | |
|---|---|---|---|
| 3 | PO-12 | pattern template | |
| 4 | PO-12 | pattern template | |
| 5 | PO-14 | pattern template | |
| 6 | PO-14 | pattern template | |
| 7 | PO-16 | pattern template | |
| 8 | PO-16 | pattern template | | patch sheets

| | | | |
|---|---|---|---|
| 1 | POM series | empty patch sheet | .pdf |
| 2 | POM-170 | example patch sheets | .pdf |
| 3 | POM-400 | example patch sheets | .pdf |

CAD files

| | | | |
|---|---|---|---|
| 1 | PO 10-series | pdf drawing | .pdf |
| 2 | PO 10-series | dxf file | .dxf |
| 3 | PO 10-series | solidworks part | .sldprt |
| 4 | PO 10-series | step file | .step |
| 5 | PO 10-series | stl file | .stl |
| 6 | OP-1 triple stand | stl file | .stl |
| 7 | OP-1 accessories | stl file | .stl |
| 8 | frekvens hacks | stl files | .zip |

FIG. 10

IDENTIFYING DOWNLOADABLE OBJECTS IN MARKUP LANGUAGE

BACKGROUND

Webpages are commonly provided in hypertext markup language (HTML) and often contain linked objects that can be downloaded. Users sometimes wish to download the linked objects, such as a bank statement, or when downloading a collection of objects from a webpage when a user is doing research.

BRIEF DESCRIPTION OF THE SEVERAL VIEWS OF THE DRAWINGS

The advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 1 illustrates an example of a content management system and client devices in accordance with some aspects of the present technology.

FIG. 10 illustrates an example move interface that can be presented by the browser extension after it has detected that the downloadable object has been downloaded directly to the client device.

DETAILED DESCRIPTION

Figure 2:
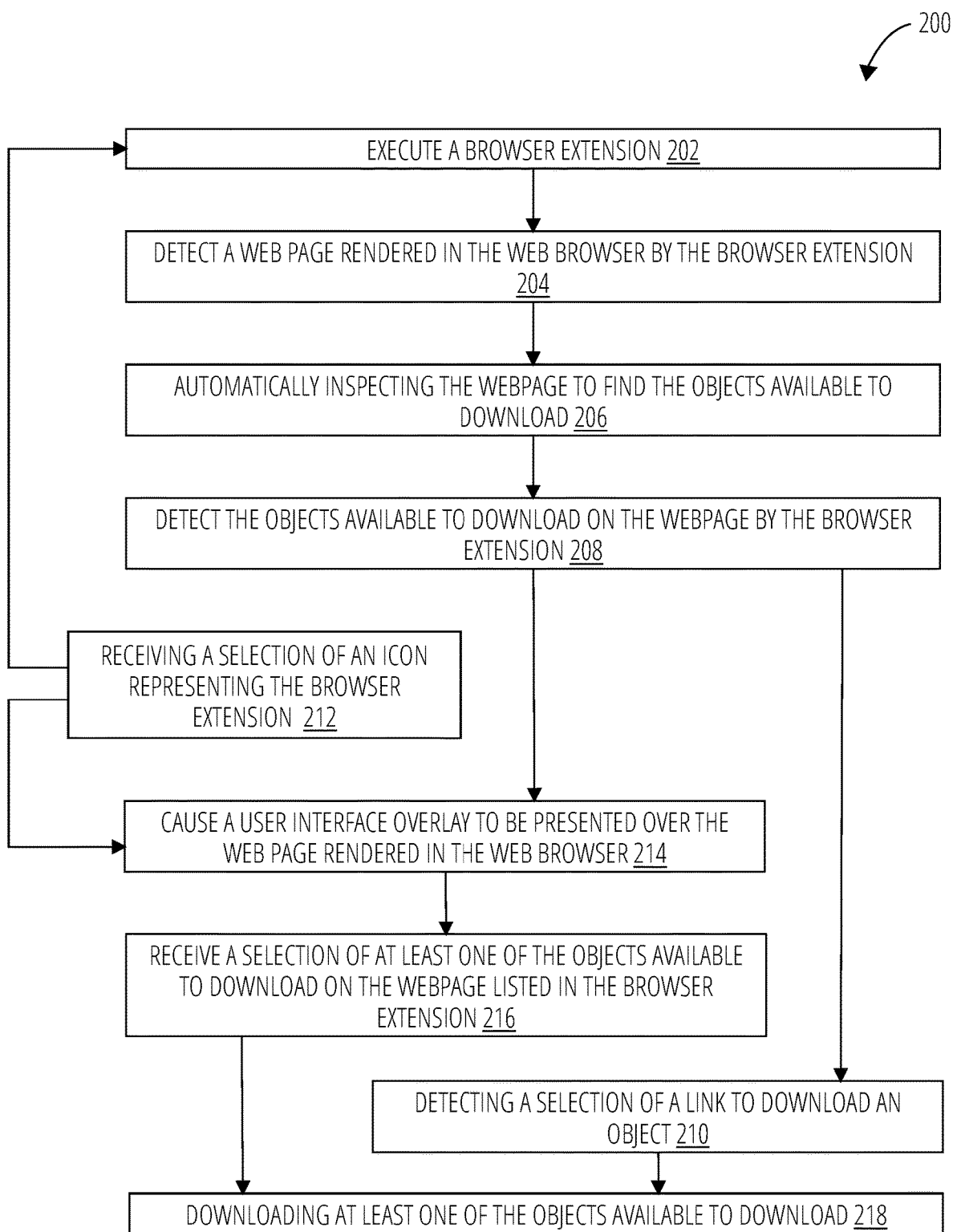
FIG. 2 illustrates an example method for automatically identifying objects available to download on a webpage in accordance with some aspects of the present technology.

Webpages are commonly provided in hypertext markup language (HTML) and often contain linked objects that can be downloaded. Users sometimes wish to download the linked objects such as in the case of downloading a bank statement, or when downloading a collection of objects from a webpage when a user is doing research.

Unfortunately, downloading objects from webpages is less convenient than it could be. Downloading an object from a webpage generally requires clicking on a link to open the object and then saving the object by interacting with a menu in the application that opened the object and selecting a folder in which to save the object, or by right-clicking on the link to open a contextual menu, and then choosing to save the object, which often is downloaded to a downloads folder. These interactions can be inefficient, especially when the user utilizes a content management system to save objects, when the user wants to save multiple objects on the same webpage, or when the user routinely saves an object on the webpage.

For example, a user that utilizes a content management system would prefer that objects are not downloaded to a generic location and instead would prefer that objects can be easily stored directly to the content management system. In the case of most web browsers and webpages, objects are first saved locally to a downloads folder before a user can navigate to the downloads folder and move or copy the object to the content management system. This requires unnecessary steps, and it also can result in a stored copy on their local machine when it may be that the user would prefer to have stored the object directly to a cloud instance of the content management system.

In another example, a user who might desire to save a plurality of objects would prefer a more efficient mechanism than quickly identifying downloadable objects on a web page and downloading them one at a time.

The present technology addresses such instances by providing a browser extension that can analyze the markup language of a webpage to identify downloadable objects and provide a more efficient mechanism for a user to select and save the downloadable objects. For example, the present technology can analyze a webpage to identify downloadable objects and can identify them in an interface distinct from the webpage. A user can select one or more objects and a download location, and the browser extension can then automatically download and save the objects to the content management system.

In some embodiments, the browser extension of the present technology can also move objects that were downloaded without the help of the browser extension to the content management system more efficiently than if the user were to handle this operation on their own (e.g., by reducing the number of navigational steps).

In some embodiments, the browser extension can be configured to download a particular object or type of object when a user visits a particular webpage. For example, a user can configure the browser extension to automatically download, or prompt the user to download, an account statement every time a user visits a webpage associated with the account.

The present technology overcomes a challenge in the art related to identifying downloadable objects on a webpage. While some objects, such as images, are often easy to identify as a downloadable object, other objects are more complicated. Not all links point to downloadable objects, and it isn't always straightforward to identify which links point to a downloadable object. This is especially true when links do not indicate an object type or file extension.

The present technology overcomes these challenges using a variety of methods. In some embodiments, the present technology evaluates a document object model (DOM) of the HTML (or other markup language such as Extensible Markup Language (XML)) to identify data surrounding links that might indicate a downloadable object is present. In some embodiments, the present technology can make "GET" or "HEAD" requests to receive information about an object to which a link points to determine if the object is a downloadable object. In some embodiments, the present technology can be configured to recognize patterns on some webpages that might indicate a link points to a downloadable object.

The present technology provides a browser extension that can recognize downloadable objects on a webpage and provides functionality that makes it easier and more efficient to download the downloadable objects to a location in a content management system.

In some embodiments the disclosed technology is deployed in the context of a content management system having object synchronization capabilities and collaboration features, among others. An example system 100 configuration is shown in FIG. 1, which depicts content management system 102 interacting with client device 134.

Accounts

Content management system 102 can store objects in association with accounts, as well as perform a variety of object management tasks, such as retrieve, modify, browse, and/or share the object(s). Furthermore, content management system 102 can enable an account to access object(s) from multiple client devices.

Content management system 102 supports a plurality of accounts. A subject (user, group, team, company, etc.) can create an account with content management system, and account details can be stored in subject database 122. Subject database 122 can identify a registered subject by a subject ID, and store profile information for registered subjects in association with the subject ID. In some cases, profile information for registered subjects includes a subject name and/or email address. Subject database 122 can include account management information, such as account type (e.g. various tiers of free or paid accounts), storage space allocated, storage space used, client devices 134 having a registered content management client application 136 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subject database 122 need not store complete information associated with an account for a subject. Some portion of information associated with an account for a subject can also be stored in another database of content management system 102 such as metadata database 130, or in a database external to content management system 102.

Subject database 122 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subject database 122 can be broken into a plurality of tables, indexes and other data structures.

Object Storage

A feature of content management system 102 is the storage of objects, which can be stored in object storage 124. An object generally is any entity that can be recorded in a file system. Objects can be any object including digital data such as documents, collaboration objects, text files, audio files, image files, video files, webpages, executable files, binary files, object directories, folders, zip files, playlists, albums, symlinks, cloud docs, mounts, placeholder objects referencing other objects in content management system 102 or in other content management systems, etc.

In some embodiments, objects can be grouped into a collection, which can refer to a folder including a plurality of objects, or a plurality of objects that are related or grouped by a common attribute.

In some embodiments, object storage 124 is combined with other types of storage or databases to handle specific functions. Object storage 124 can store objects, while metadata regarding the objects can be stored in metadata database 130. Likewise, data regarding where an object is stored in object storage 124 can be stored in object directory 126. Additionally, data regarding changes, access, etc. can be stored in objects database 132. Objects database 132 can also include a subject account identifier that identifies the subject IDs that have access to the object.

In some embodiments, objects database 132 can be broken into a plurality of tables, indexes and other data structures.

Each of the various storages/databases such as object storage 124, object directory 126, objects database 132, and metadata database 130 can be comprised of more than one such storage or database and can be distributed over many devices and locations. Other configurations are also possible. For example, data from object storage 124, object directory 126, objects database 132, and/or metadata database 130 may be combined into one or more object storages or databases or further segmented into additional object storages or databases. Thus, content management system 102 may include more or less storages and/or databases than shown in FIG. 1.

In some embodiments, object storage 124 is associated with at least one object storage service 106, which includes software or other processor executable instructions for managing the storage of objects including, but not limited to, receiving objects for storage, preparing objects for storage, selecting a storage location for the object, retrieving objects from storage, etc. In some embodiments, object storage service 106 can divide an object into smaller chunks for storage at object storage 124. The location of each chunk making up an object can be recorded in object directory 126. Object directory 126 can include a content entry for each object stored in object storage 124. The content entry can be associated with an object ID, which uniquely identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, object storage service 106 can output a unique hash for each different version of an object.

Object storage service 106 can also designate or record a parent of an object or a content path for an object in objects database 132. The content path can include the name of the object and/or folder hierarchy associated with the object. For example, the content path can include a folder or path of folders in which the object is stored in a local file system on a client device. In some embodiments, object database might only store a direct ancestor or direct child of any object, which allows a full path for an object to be derived, and can be more efficient than storing the whole path for an object.

While objects are stored in object storage 124 in blocks and may not be stored under a tree like directory structure, such directory structure is a comfortable navigation structure for subjects viewing objects. Object storage service 106 can define or record a content path for an object wherein the "root" node of a directory structure can be any directory with specific access privileges assigned to it, as opposed to a directory that inherits access privileges from another directory.

In some embodiments a root directory can be mounted underneath another root directory to give the appearance of a single directory structure. This can occur when an account has access to a plurality of root directories. As addressed above, the directory structure is merely a comfortable navigation structure for subjects viewing objects, but does not correlate to storage locations of objects in object storage 124.

While the directory structure in which an account views objects does not correlate to storage locations of the objects at content management system 102, the directory structure can correlate to storage locations of the objects on client device 134 depending on the file system used by client device 134.

As addressed above, a content entry in object directory 126 can also include the location of each chunk making up an object. More specifically, the content entry can include content pointers that identify the location in object storage 124 of the chunks that make up the object.

Object storage service 106 can decrease the amount of storage space required by identifying duplicate objects or duplicate blocks that make up an object or versions of an object. Instead of storing multiple copies, object storage 124 can store a single copy of the object or block of the object, and object directory 126 can include a pointer or other mechanism to link the duplicates to the single copy.

Object storage service 106 can also store metadata describing objects, object types, folders, file path, and/or the relationship of objects to various accounts, collections, or groups in metadata database 130, in association with the object ID of the object.

Object storage service 106 can also store a log of data regarding changes, access, etc. in objects database 132. Objects database 132 can include the object ID of the object and can optionally include a description of the change or access action along with a time stamp or version number and any other relevant data. Objects database 132 can also include pointers to blocks affected by the change or object access. Object storage service 106 can also provide the ability to undo operations, by using an object version control mechanism that tracks changes to objects, different versions of objects (including diverging version trees), and a change history that can be acquired from objects database 132.

Object Synchronization

Another feature of content management system 102 is synchronization of objects with at least one client device 134. Client device(s) 134 can take different forms and have different capabilities. For example, client device 134 can be a computing device having a local file system accessible by multiple applications resident thereon. Client device 134 can be a computing device wherein objects are only accessible to a specific application or by permission given by the specific application, and the objects are typically stored either in an application specific space or in the cloud. Client device 134 can be any client device accessing content management system 102 via a web browser and accessing objects via a web interface. While example client device 134 is depicted in form factors such as a laptop, mobile device, or web browser, it should be understood that the descriptions thereof are not limited to devices of these example form factors. For example a mobile device might have a local file system accessible by multiple applications resident thereon, or might access content management system 102 via a web browser. As such, the form factor should not be considered limiting when considering client 134's capabilities. One or more functions described herein with respect to client device 134 may or may not be available on every client device depending on the specific capabilities of the device—the file access model being one such capability.

In many embodiments, client devices 134 are associated with an account of content management system 102, but in some embodiments client devices 134 can access content using shared links and do not require an account.

As noted above, some client devices can access content management system 102 using a web browser. However, client devices can also access content management system 102 using client application 136 stored and running on client device 134. Client application 136 can include a client synchronization service 138.

Client synchronization service 138 can be in communication with server synchronization service 104 to synchronize changes to objects between client device 134 and content management system 102.

Client device 134 can synchronize content with content management system 102 via client synchronization service 138. The synchronization can be platform agnostic. That is, content can be synchronized across multiple client devices of varying types, capabilities, operating systems, etc. Client synchronization service 138 can synchronize any changes (e.g., new, deleted, modified, copied, or moved objects) to objects in a designated location of a file system of client device 134.

Objects can be synchronized from client device 134 to content management system 102, and vice versa. In embodiments wherein synchronization is from client device 134 to content management system 102, a subject can manipulate objects directly from the file system of client device 134, while client synchronization service 138 can monitor directory on client device 134 for changes to files within the monitored folders.

When client synchronization service 138 detects a write, move, copy, or delete of content in a directory that it monitors, client synchronization service 138 can synchronize the changes to content management storage service 106. In some embodiments, client synchronization service 138 can perform some functions of content management storage service 106 including functions addressed above such as dividing the object into blocks, hashing the object to generate a unique identifier, etc. Client synchronization service 138 can index content within client storage index 142 and save the result in client storage index 142. Indexing can include storing paths plus the object identifier, and a unique identifier for each object. In some embodiments, client synchronization service 138 learns the object identifier from server synchronization service 104, and learns the unique client identifier from the operating system of client device 134.

Client synchronization service 138 can use storage index 142 to facilitate the synchronization of at least a portion of the objects within client storage with objects associated with a subject account on content management system 102. For example, client synchronization service 138 can compare storage index 142 with content management system 102 and detect differences between content on client storage and content associated with a subject account on content management system 102. Client synchronization service 138 can then attempt to reconcile differences by uploading, downloading, modifying, and deleting content on client storage as appropriate. Object storage service 106 can store the changed or new block for the object and update objects database 132, metadata database 130, object directory 126, object storage 124, subject database 122, etc. as appropriate.

When synchronizing from content management system 102 to client device 134, data regarding a mount, modification, addition, deletion, move of an object recorded in objects database 132 can trigger a notification to be sent to client device 134 using notification service 108. When client device 134 is informed of the change, client device 134 can make a request for changes listed in objects database 132 since the last synchronization point known to the client device. When client device 134 determines that it is out of synchronization with content management system 102, client synchronization service 138 requests object blocks including the changes, and updates its local copy of the changed objects.

In some embodiments, storage index 142 stores tree data structures wherein one tree reflects the latest representation of a directory according to server synchronization service 104, while another tree reflects the latest representation of the directory according to client synchronization service 138. Client synchronization service can work to ensure that the tree structures match by requesting data from server synchronization service 104 or committing changes on client device 134 to content management system 102.

Sometimes client device 134 might not have a network connection available. In this scenario, client synchronization service 138 can monitor the linked collection for object changes and queue those changes for later synchronization to content management system 102 when a network connection is available. Similarly, a subject can manually start, stop, pause, or resume synchronization with content management system 102.

Client synchronization service 138 can synchronize all content associated with a particular subject account on content management system 102. Alternatively, client synchronization service 138 can selectively synchronize some of the objects associated with the particular subject account on content management system 102. Selectively synchronizing only some of the objects can preserve space on client device 134 and save bandwidth.

In some embodiments, client synchronization service 138 selectively stores a portion of the objects associated with the particular subject account and stores placeholder objects in client storage for the remainder portion of the objects. For example, client synchronization service 138 can store a placeholder object that has the same filename, path, extension, metadata, of its respective complete object on content management system 102, but lacking the data of the complete object. The placeholder object can be a few bytes or less in size while the respective complete object might be significantly larger. After client device 134 attempts to access the object, client synchronization service 138 can retrieve the data of the object from content management system 102 and provide the complete object to client device 134. This approach can provide significant space and bandwidth savings while still providing full access to a subject's objects on content management system 102.

While the synchronization embodiments addressed above referred to client device 134 and a server of content management system 102, it should be appreciated by those of ordinary skill in the art that a user account can have any number of client devices 134 all synchronizing objects with content management system 102, such that changes to an object on any one client device 134 can propagate to other client devices 134 through their respective synchronization with content management system 102.

Collaboration Features

Another feature of content management system 102 is to facilitate collaboration between subjects. Collaboration features include object sharing, commenting on objects, co-working on objects in real time, instant messaging, providing presence and "seen" state information regarding objects, etc.

Sharing

Content management system 102 can manage sharing objects via sharing service 114. Sharing an object by providing a link to the object can include making the object accessible from any computing device in network communication with content management system 102. However, in some embodiments a link can be associated with access restrictions enforced by content management system 102 and Identity and Access Management (IAM) service 118. Sharing content can also include linking content using sharing service 114 to share content within content management system 102 with at least one additional subject account (in addition to the original subject account associated with the object) so that each subject account has access to the object. The additional subject account can gain access to the content by accepting the content, which will then be accessible through either web interface service 110 or directly from within the directory structure associated with their account on client device 134. The sharing can be performed in a platform agnostic manner. That is, the content can be shared across multiple client devices 134 of varying type, capabilities, operating systems, etc. The content can also be shared across varying types of subject accounts.

To share an object within content management system 102 sharing service 114 can add associate a subject ID of a team or of one or more subject accounts with a content item in objects database 132 associated with the object, thus granting the added subject account(s) access to the object. Sharing service 114 can also remove subject IDs from being permitted to access a content item in objects database 132 to restrict a subject account's access to the object. Sharing service 114 can record object identifiers, subject identifiers given access to an object, and access levels in objects database 132. For example, in some embodiments, subject identifiers associated with a single content item can specify different permissions for respective subject identifiers with respect to the associated object.

In some embodiments, content management system 102 can include an access control list 128 which includes a description of complete access rights pertaining to a respective object. An access control list for any respective object in content management system can be derived from objects database 132. In some embodiments, it is not desirable to maintain a persistent access control list 128 for a respective object, as an access control list 128 for a respective object can be derived when needed. In some embodiments, objects can inherit access rights from another object such as ancestor objects.

To share objects outside of content management system 102, sharing service 114 can generate a custom network address, such as a uniform resource locator (URL), which allows any web browser to access the object or collection in content management system 102 without any authentication. To accomplish this, sharing service 114 can include content identification data in the generated URL, which can later be used to properly identify and return the requested object. For example, sharing service 114 can include a token identifying an object ID and optionally a subject ID in the generated URL. Upon selection of the URL, the content identification data included in the URL can be transmitted to content management system 102, which can use the received content identification data to identify the appropriate object and return the object.

In addition to generating the URL, sharing service 114 can also be configured to record in objects database 132 that a URL to the object has been created. In some embodiments, an entry into objects database 132 associated with an object can include a URL flag indicating whether a URL to the object has been created. For example, the URL flag can be a Boolean value initially set to 0 or false to indicate that a URL to the object has not been created. Sharing service 114 can change the value of the flag to 1 or true after generating a URL to the object.

In some embodiments, sharing service 114 can associate a set of permissions to a URL for an object. For example, if a subject attempts to access the object via the URL, sharing service 114 can provide a limited set of permissions for the object. Examples of limited permissions include restrictions that the subject cannot download the object, save the object, copy the object, modify the object, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, sharing service 114 can also be configured to deactivate a generated URL. For example, each entry into objects database 132 can also include a URL active flag indicating whether the content should be returned in response to a request from the generated URL. For example, sharing service 114 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 114 can reactivate the URL by again changing the value of the URL active flag to 1 or true. A subject can thus easily restore access to the object without the need to generate a new URL.

In some embodiments, content management system 102 can designate a URL for uploading an object. For example, a first subject with a subject account can request such a URL, provide the URL to a contributing subject and the contributing subject can upload an object to the first subject's subject account using the URL.

Team Service

In some embodiments content management system 102 includes team service 116. Team service 116 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Team service 116 can provide a common shared space for the team, private subject account folders, and access limited shared folders. Team service 116 can also provide a management interface for an administrator to manage collections and objects within team, and can manage subject accounts that are associated with the team. Teams, sub-teams, subject accounts are all given a subject identifier in subject database 122, and the membership to teams by subject accounts is also recorded in subject database 122.

IAM (Identity and Access Management) Service

In some embodiments, content management system 102 includes IAM service 118. IAM service 118 can authenticate a subject account. For subject accounts with multiple levels of rights (e.g. a subject account with subject rights and administrator rights) IAM service 118 can also facilitate explicit privilege escalation to avoid unintentional actions by administrators.

Object Access

Object storage service 106 can receive a token from client application 136 that follows a request to access an object and can return the capabilities permitted to the subject account.

Presence and Seen State

In some embodiments, content management system can provide information about how subjects with which an object is shared are interacting or have interacted with the object. In some embodiments, content management system 102 can report that a subject with which an object is shared is currently viewing the object. For example, client collaboration service 140 can notify notification service 108 when client device 134 is accessing the object. Notifications service 108 can then notify all client devices of other subjects having access to the same object of the presence of the subject of client device 134 with respect to the object.

In some embodiments, content management system 102 can report a history of subject interaction with a shared object. Collaboration service 112 can query data sources such as metadata database 130 and objects database 132 to determine that a subject has saved the object, that a subject has yet to view the object, etc., and disseminate this status information using notification service 108 to other subjects so that they can know who currently is or has viewed or modified the object.

Collaboration service 112 can facilitate comments associated with content, even if an object does not natively support commenting functionality. Such comments can be stored in metadata database 130.

Collaboration service 112 can originate and transmit notifications for subjects. For example, a subject can mention another subject in a comment and collaboration service 112 can send a notification to that subject letting them know that they have been mentioned in the comment. Various other object events can trigger notifications, including deleting an object, sharing an object, etc.

Collaboration service 112 can also provide a messaging platform whereby subjects can send and receive instant messages, voice calls, emails, etc.

Collaboration Objects

In some embodiments content management service can also include collaborative document service 120 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects access an object through a web interface and there they can work on the same copy of the object at the same time.

Collaboration Companion Interface

In some embodiments client collaboration service 140 can provide a native application companion interface for the purpose of displaying information relevant to an object being presented on client device 134. In embodiments wherein an object is accessed by a native application stored and executed on client device 134, where the object is in a designated location of the file system of client device 134 such that the object is managed by client application 136, the native application may not provide any native way to display the above addressed collaboration data. In such embodiments, client collaboration service 140 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 124 via an application programming interface (API) on behalf of a subject. For example, a software package such as an application running on client device 134, can programmatically make API calls directly to content management system 102 when a subject provides authentication credentials, to read, write, create, delete, share, or otherwise manipulate content.

A subject can view or manipulate content stored in a subject account via a web interface generated and served by web interface service 110. For example, the subject can navigate in a web browser to a web address provided by content management system 102. Changes or updates to content in the object storage 124 made through the web interface, such as uploading a new version of an object, can be propagated back to other client devices associated with the subject's account. For example, multiple client devices, each with their own client software, can be associated with a single account and objects in the account can be synchronized between each of the multiple client devices.

Client device 134 can connect to content management system 102 on behalf of a subject. A subject can directly interact with client device 134, for example when client device 134 is a desktop or laptop computer, phone, television, internet-of-things device, etc. Alternatively or additionally, client device 134 can act on behalf of the subject without the subject having physical access to client device 134, for example when client device 134 is a server.

Some features of client device 134 are enabled by an application installed on client device 134. In some embodiments, the application can include a content management system specific component. For example, the content management system specific component can be a stand-alone client application 136, one or more application plug-ins. However, the subject can also interact with content management system 102 via a third-party application, such as a web browser, that resides on client device 134 and is configured to communicate with content management system 102. In various implementations, the client application 136 can present a subject interface (UI) for a subject to interact with content management system 102. For example, the subject can interact with the content management system 102 via a file system explorer integrated with the file system or via a webpage displayed using a web browser application.

In some embodiments, client application 136 can be configured to manage and synchronize content for more than one account of content management system 102. In such embodiments client application 136 can remain logged into multiple accounts and provide normal services for the multiple accounts. In some embodiments, each account can appear as folder in a file system, and all objects within that folder can be synchronized with content management system 102. In some embodiments, client application 136 can include a selector to choose one of the multiple accounts to be the primary account or default account.

In some embodiments, client device 134 can have a browser extension 144 installed to operate with a web browser. In such embodiments, the browser extension 144 can extend functionality of the content management system 102 into a web browser as is addressed in more detail herein.

In some embodiments, the client device 134 can have the client application 136 installed on the client device 134 as well as the browser extension 144.

While the description herein refers to the browser extension 144, persons of ordinary skill in the art will appreciate that the functionalities ascribed to the browser extension 144 herein can be located in another software service that is not a browser extension or plugin. Any service that is capable of identifying data structures associated with downloadable objects in a document, application, webpage, etc. can be substituted for the browser extension 144. In most embodiments addressed herein, the browser extension 144 can be any service that can recognize URLs (or other links) that, when selected, result in requesting and receiving an object. For example, while termed a browser extension 144, the present technology would encompass a service that can parse a document file organized in a recognizable structure (such as .xml or .docx or .xlsx, etc.) to identify links associated with objects to download. There is no requirement that the service need to be a browser extension or plugin to an application; it can be a stand along service or integrated into client application 136.

Third Party Services

In some embodiments content management system 102 can include functionality to interface with one or more third party services such as workspace services, email services, task services, etc. In such embodiments, content management system 102 can be provided with login credentials for a subject account at the third party service to interact with the third party service to bring functionality or data from those third party services into various subject interfaces provided by content management system 102.

While content management system 102 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

FIG. 2 illustrates an example method for automatically identifying objects available to download on a webpage. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

In some embodiments, the method includes executing a browser extension at block 202. For example, the client device 134, illustrated in FIG. 1, executes the browser extension. The browser extension can be associated with the content management system 102. The content management system 102 can provide the browser extension 144 for direct download from the content management system 102 or from an extensions store provided by a web browser. In some embodiments, the browser extension can be a web browser plugin. As will be further described herein, the browser extension can be configured to extend the functionality of the content management system 102 into a web browser and identify downloadable objects in a markup language file, such as an HTML webpage.

In some embodiments, the browser extension can begin to be executed after the browser receives a user input that selects an icon representing the browser extension, as shown in block 212.

In some embodiments, the method includes detecting a webpage rendered in the web browser at block 204. For example, the browser extension 144 illustrated in FIG. 1 detects a webpage rendered in the web browser.

In some embodiments, the method includes automatically inspecting the webpage to find the objects available to download to which uniform resource locators (URLs) are provided on the webpage at block 206. For example, the browser extension 144 illustrated in FIG. 1 automatically inspects the webpage once the browser extension detects a webpage to find the objects available to download to which uniform resource locators (URLs) are provided on the webpage. Once the markup file is downloaded and becomes accessible to the browser extension, the browser extension can begin to inspect the webpage. In this way, the browser extension can inspect the webpage even before a user selects one of the links on the webpage. In some embodiments, the browser extension does not need to wait for the webpage to finish rendering.

In some embodiments, the method includes detecting the objects available to download on the webpage at block 208. For example, the browser extension 144 illustrated in FIG. 1 detects the objects available to download on the webpage.

The browser extension 144 can detect the objects available to download on the webpage using several techniques. In one technique, the browser extension 144 can parse a document object model (DOM) of the markup file making up the webpage to identify a plurality of the URLs that satisfy at least one criterion from a plurality of criteria. An example of the criterion is that the URL is associated with an anchor tag with an attribute corresponding to an object available to download. In another technique, the browser extension 144 can detect that the URL string matches a regular expression (REGEX) pattern that corresponds to objects that have been observed to be downloadable. In another technique, the browser extension 144 can send HTTP 'GET' or 'HEAD' requests when calling a link and analyzing the response to these requests to determine if the link is associated with a downloadable object. The method is not limited to just one of these techniques. Multiple of these techniques and other techniques can be used together.

The downloadable objects to which the links might point can include at least one portable document format (.pdf), a word processing document, image, video, GIF, ZIP file, MP4, SVG, etc., or any other downloadable object.

In some embodiments, the method includes receiving a selection of an icon representing the browser extension at block 212. For example, the browser extension 144 illustrated in FIG. 1 receives a selection of an icon representing the browser extension.

In some embodiments, the method includes causing a user interface overlay to be presented over the webpage rendered in the web browser at block 214. For example, the browser extension 144 illustrated in FIG. 1 causes a user interface overlay to be presented over the webpage rendered in the web browser. In some examples, at least a portion of the user interface can be presented automatically when downloadable objects are detected on the webpage. In some embodiments, a user first selects the browser extension as in block 212 before the browser extension displays the user interface overlay. In some examples, the user interface overlay includes a list of the objects detected on the webpage by the browser extension.

Figure 3A:
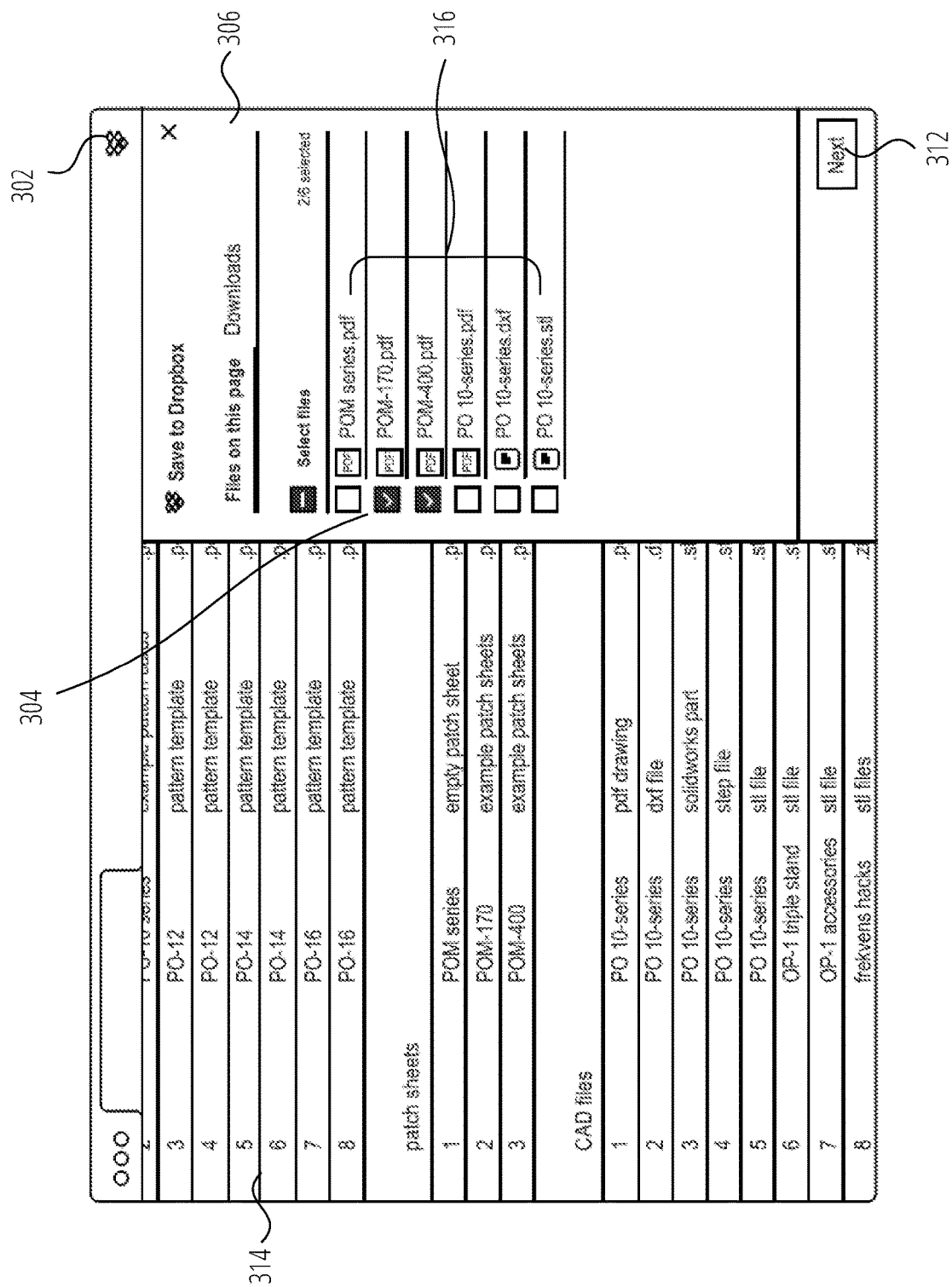
FIG. 3A and FIG. 3B illustrates an example webpage including a plurality of downloadable objects and which a browser extension has detected at least some of the downloadable objects in accordance with some aspects of the present technology.
Figure 3B:
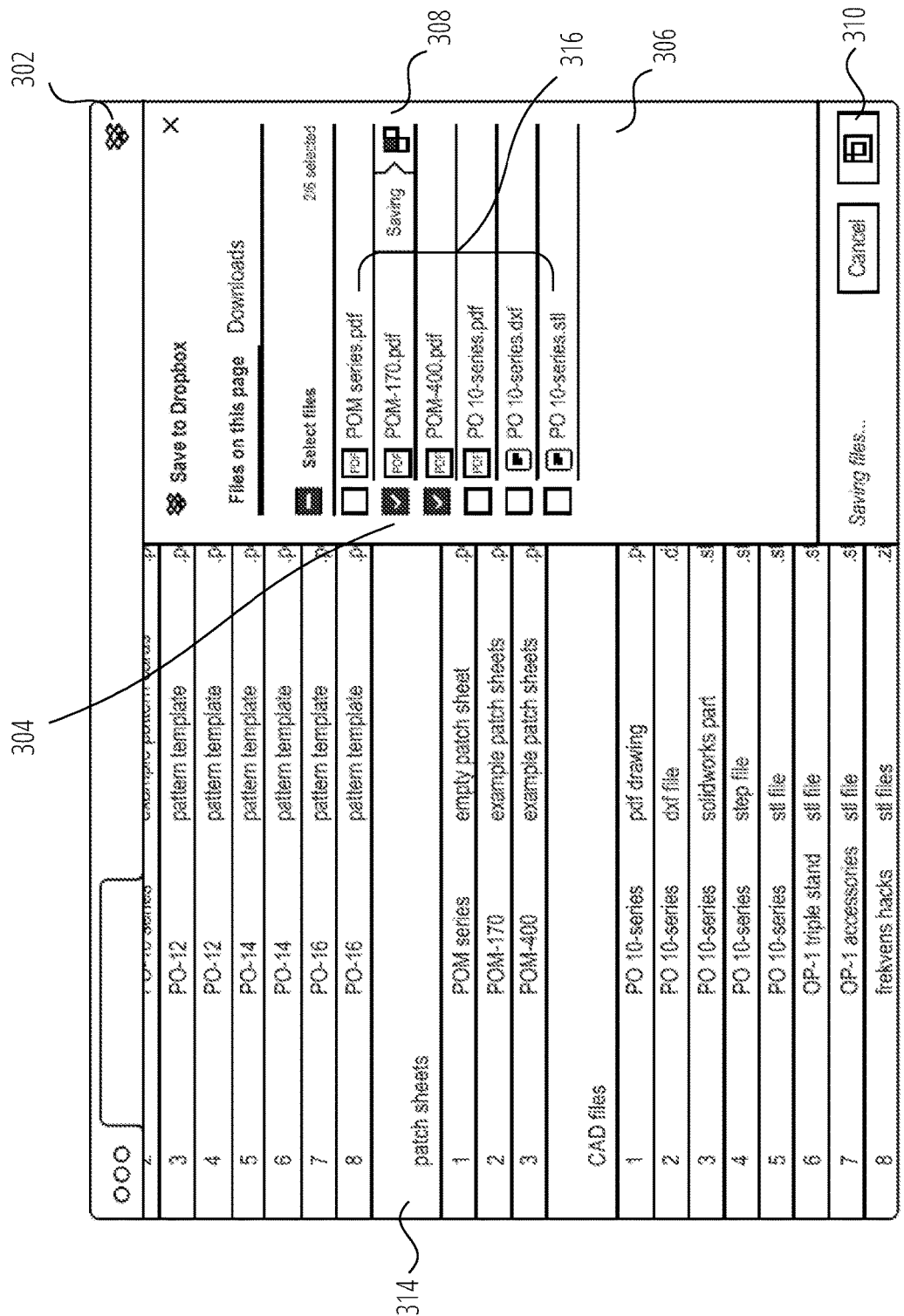

In some embodiments, the user interface overlay provided by the browser extension can include a listing of the downloadable objects. In some examples, the listing of downloadable objects can be ordered by rank according to a confidence measure that the links point to downloadable objects. In some examples, the listing of downloadable objects can be ordered by rank according to a relevance measure indicating how likely the downloadable object is of a type of downloadable object that the user would want to download. An example user interface overlay showing a listing of downloadable objects is illustrated in FIG. 3A and FIG. 3B.

In some embodiments, the method includes receiving a selection of at least one of the objects available to download on the webpage listed in the browser extension at block 216. For example, the browser extension 144 illustrated in FIG. 1 receives a selection of at least one of the objects available to download on the webpage listed in the browser extension. In some examples, the selection of at least one link from the list in the browser extension indicates that a user desires to download at least one object associated with the at least one link that has been selected. In some examples, the selection of at least one of the objects available to download on the webpage listed in the browser extension is a selection of a plurality of the objects available to download on the webpage.

In some embodiments, the browser extension can provide a sort or filter option to sort or filter the list of the objects detected on the webpage by the browser extension. For example, a filter could be provided to allow a user to filter objects by object type/extension (e.g., .pdf, .docx. .mp4, etc.). A sort option can include an interface to sort objects by size or alphabetical order. The sort or filter options can be provided in a user interface such as illustrated in FIG. 3A or FIG. 3B.

Figure 9:
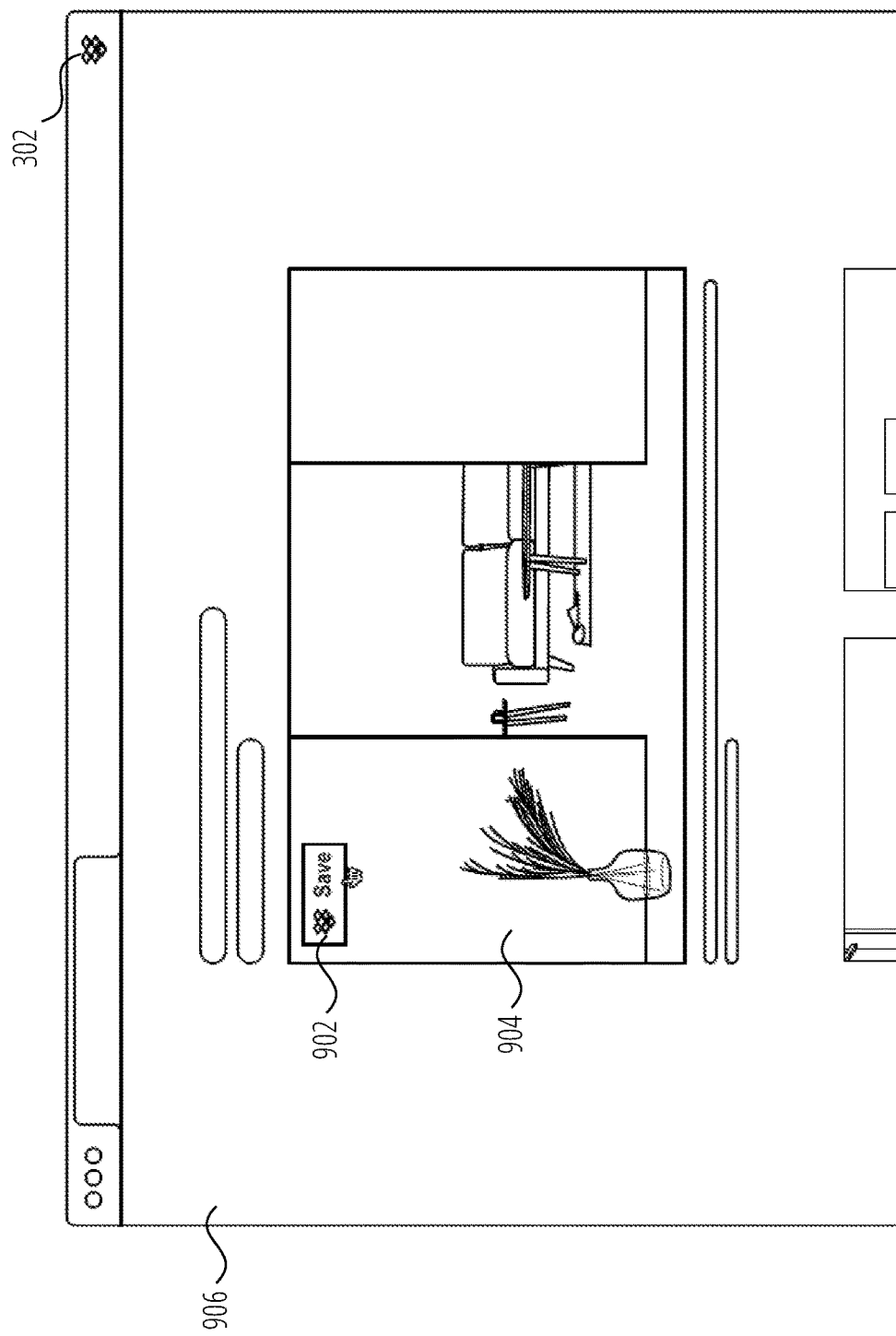
FIG. 9 illustrates an example webpage where the browser extension has indicated that it has detected a downloadable object with a recognized object icon in accordance with some aspects of the present technology.

In some embodiments, the browser extension can also or alternatively provide a visual indication that a URL on webpage corresponds to one of the objects available to download from the webpage. In an example, the browser extension can provide an icon as an overlay near links associated with objects to download as illustrated in FIG. 9. In another example, the browser extension can insert an icon into the markup language for the webpage to cause the browser to display the icon near links associated with objects to download. In this way, the browser extension can provide a visual indication on the webpage to indicate which links the browser extension has determined are associated with objects to download. Thereby the user can expect to find a listing of the object in the overlay provided by the browser extension listing objects to download.

In some embodiments, the icon may also be used to directly download the object using the browser extension. The method includes detecting the selection of a link to download an object at block 210. For example, the browser extension 144 illustrated in FIG. 1 detects a selection of a link to download an object, wherein the selection results in a presentation of a contextual menu that includes an option to present the user interface overlay that includes the list of objects available to download on the webpage, wherein the selection of the link to download the object refers to a first object that is among the objects detected on the webpage by the browser extension.

In some embodiments, the method includes downloading at least one of the objects available to download at block 218. For example, the browser extension 144 illustrated in FIG. 1 downloads at least one of the objects available to download and can store the object in the content management system 102.

FIG. 3A illustrates an example webpage 314 including a plurality of downloadable objects where a browser extension has detected at least some of the downloadable objects in the webpage 314. When a user desires to see the browser extension overlay 306 a user can provide an input to select the browser extension icon 302. As described herein, after receiving a selection of the browser extension icon 302, the browser extension overlay 306 can be displayed. The browser extension can display the list of detected downloadable objects 316 in a browser extension overlay 306. The list of detected downloadable objects 316 provides a benefit that makes it easy to quickly identifying downloadable objects on a web page. Instead of a user having to browse and navigate through a webpage to find objects to download, the browser extension overlay 306 provides a convenient list.

When a user recognizes downloadable objects from the detected downloadable objects 316 that the user would like to download, the user can select one or more downloadable objects, such as illustrated with respect to selected downloadable object 304. This feature makes it easy to select and download objects of interest directly from the browser extension overlay 306. After the user has selected the selected downloadable objects 304, the user can select the next button 312 to move forward with downloading the downloadable objects to the content management system.

FIG. 3B illustrates another example of webpage 314. In this example, the user has advanced to attempting to download the selected downloadable object 304. As illustrated in FIG. 3B, the user has selected the save button 310, and the browser extension has begun saving the objects to the content management system 102. For example, one of the downloadable objects is currently being downloaded, as illustrated by download indicator 308. When the user selects multiple objects, the browser extension 144 can download all of the objects to the desired location in one action rather than needing to download and save each object individually.

Figure 4:
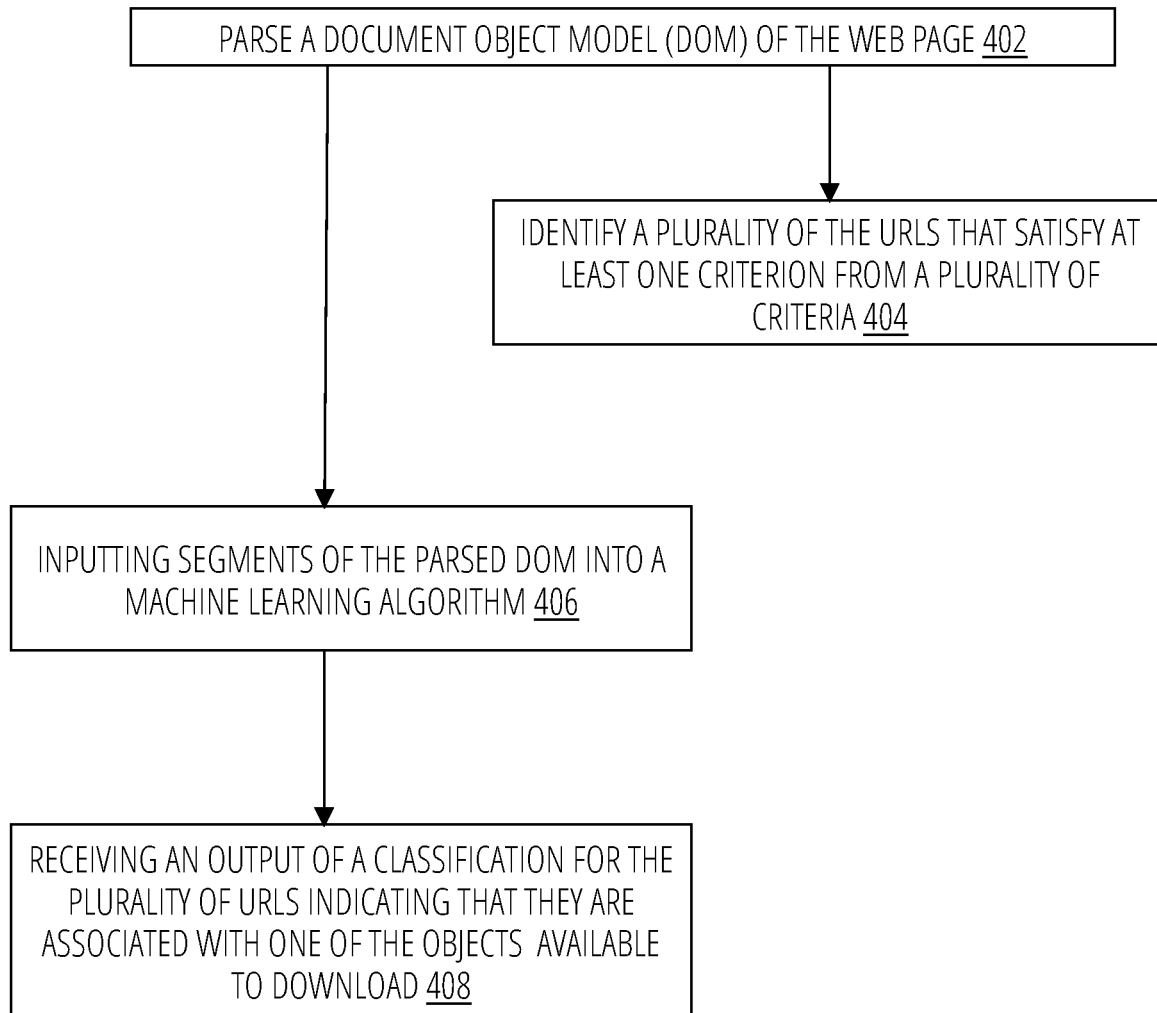
FIG. 4 illustrates an example method for evaluating a document object model (DOM) of a markup language object to identify objects available to download in accordance with some aspects of the present technology.

FIG. 4 illustrates an example method for evaluating a document object model (DOM) of a markup language object, such as a webpage, to identify objects available to download through the markup language object. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

As addressed above, one method for detecting the objects available to download on the webpage includes evaluating a document object model (DOM) of the webpage. FIG. 4 illustrates an example method of evaluating the DOM via a heuristic and/or a machine learning algorithm.

In some embodiments, the method includes parsing a document object model (DOM) of the webpage at block 402. For example, the browser extension 144 illustrated in FIG. 1 parses the document object model (DOM) of the webpage.

In some embodiments, the method includes identifying a plurality of the URLs that satisfy at least one criterion from a plurality of criteria at block 404. For example, the browser extension 144 illustrated in FIG. 1 uses a heuristic to identify a plurality of the URLs that satisfy at least one criterion from a plurality of criteria. In some examples, the URLs that satisfy at least one criterion are identified as URLs associated with a downloadable object. One example criterion is that the URL is associated with an anchor tag that is an attribute corresponding to an object available to download. For instance, the URL might be located under or otherwise associated with an anchor tag in the DOM of the webpage that suggests the URL links to a downloadable object. The anchor might indicate a downloadable object by referencing a commonly downloadable object type, such as a pdf, docx, jpeg, etc. In some examples, the URLs that satisfy the at least one criterion are URLs that specify an object name in the text associated with a link (e.g., a URL "domain.com/filename.pdf" identifies the name of a downloadable object—"filename.pdf")

In some embodiments, the method includes inputting segments of the parsed DOM into a machine learning algorithm at block 406 and receiving an output of a classification for each of the plurality of URLs included in the webpage, indicating whether the URLs are associated with an object available to download at block 408. For example, the browser extension 144 illustrated in FIG. 1 inputs segments of the parsed DOM into a machine-learning algorithm. The machine-learning algorithm might be part of the code of the browser extension 144 or might be a separate function located on a network that is called by the browser extension 144. The machine learning algorithm can classify each URL according to a probability that a respective URL is associated with a downloadable object. The browser extension 144 illustrated in FIG. 1 can receive the output of the classification for the plurality of URLs indicating whether they are associated with an object available to download.

FIG. 4 illustrates an example method for determining whether a link is associated with an object to download by using a 'HEAD' or 'GET' request. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

Another method to determine whether a link is associated with an object to download is by using a 'HEAD' or 'GET' request. These hypertext transfer protocol (HTTP) commands call the link to receive data back. The 'HEAD' request is for the header information for an object referenced by the link. The 'GET' request is for the object referenced by the link. In some embodiments, the 'GET' request can be modified to request only a first 'X' number of bytes of the object referenced by the link.

Figure 5:
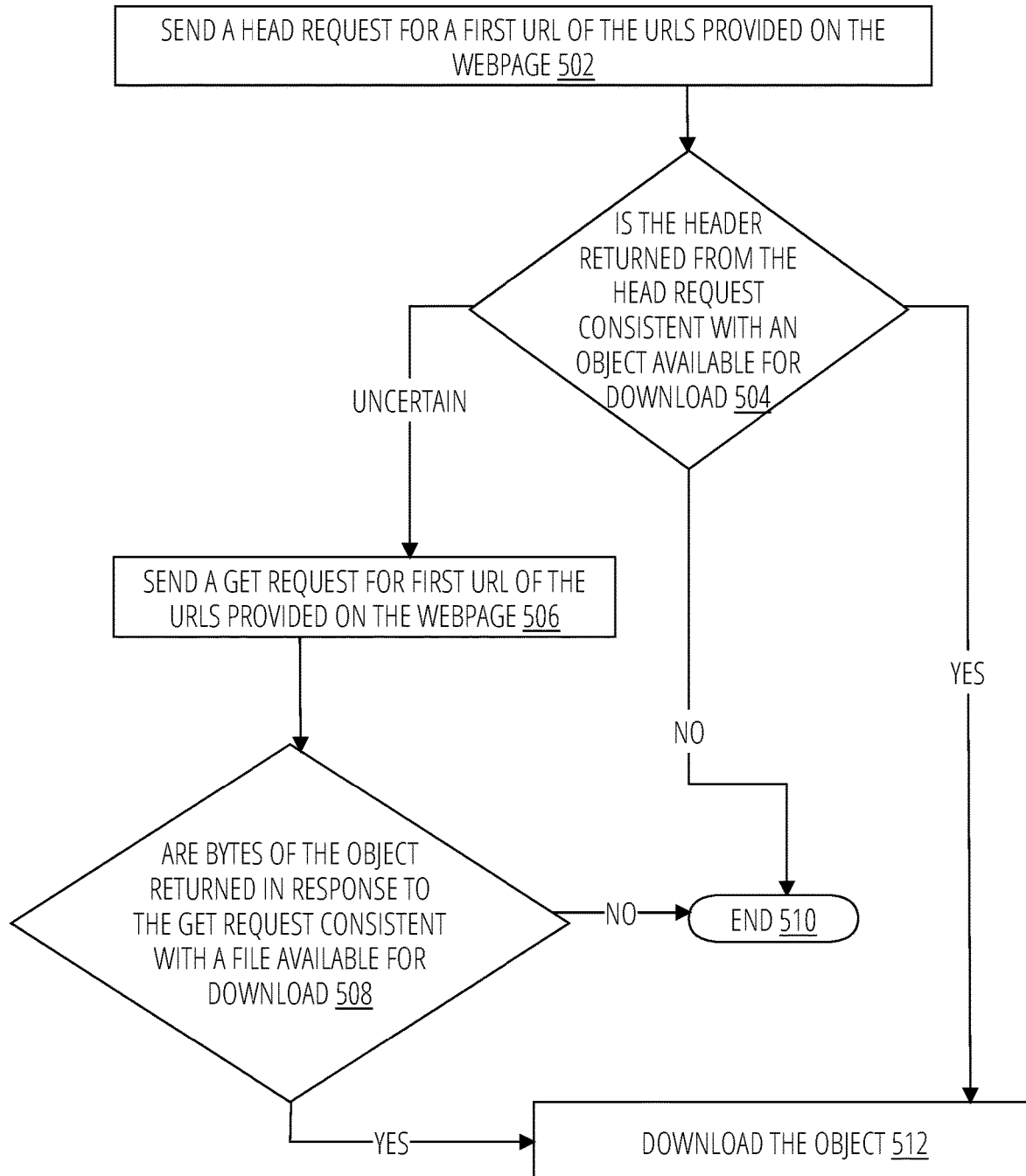
FIG. 5 illustrates an example method for determining whether a link is associated with an object to download by using a 'HEAD' or 'GET' request in accordance with some aspects of the present technology.

While the data returned from a 'HEAD' or 'GET' request can be more informative and can result in a more accurate determination of whether a URL is associated with a downloadable object, it can take a noticeable amount of time before a response is received even in the best of circumstances, and they are also subject to latency common with Internet traffic that can increase the response time further. Accordingly, in some embodiments, the method illustrated in FIG. 5 might only be utilized for links on a webpage for which the methods addressed with respect to FIG. 4 are uncertain as to whether a particular link might be associated with a downloadable object.

In some embodiments, the method includes sending a HEAD request for a first URL of the URLs provided on the webpage at block 502. For example, the browser extension 144 illustrated in FIG. 1 sends a HEAD request for a first URL of the URLs provided on the webpage.

In some embodiments, the method includes determining whether the header returned from the HEAD request is consistent with an object available for download at decision block 504. For example, the browser extension 144 illustrated in FIG. 1 can parse the header returned from the HEAD request and determine if it is consistent with an object available for download. In some instances, the header received from the HEAD request might be ambiguous.

When the browser extension 144 determines that the header received from the HEAD request is consistent with an object available to download, the browser extension 144 can download the object as illustrated at block 512. The browser extension 144 can download the object using a GET request that requests the entire object.

In some embodiments, the method includes sending a GET request for the first URL of the URLs provided on the webpage at block 506. For example, the browser extension 144 illustrated in FIG. 1 sends a GET request for the first URL of the URLs provided on the webpage. In some examples, the GET request specifies a content length. The browser extension 144 can utilize a GET request as illustrated in block 506 with or without first attempting a HEAD request. In some examples, the GET request is utilized only when browser extension 144 is unable to make a determination at decision block 504 (the header is ambiguous) regarding whether the link is associated with a downloadable object from the data return from the HEAD request. Since a GET request generally returns more data and is, therefore, slower to complete than the HEAD request, the GET request can be reserved as a last resort for some links.

In some embodiments, the method includes determining that bytes of an object returned in response to the GET request are consistent with an object available for download at decision block 508. For example, the browser extension 144 illustrated in FIG. 1 can determine that bytes of an object returned in response to the GET request are consistent with an object available for download, and can proceed to download the object as illustrated at 512.

When browser extension 144 determines that either the response to the HEAD request (decision block 504) or the response to the GET request (decision block 508) are not consistent with a downloadable object, the method can end as illustrated as done block 510.

In some embodiments, a plurality of GET and/or HEAD requests can be made in parallel.

Figure 6:
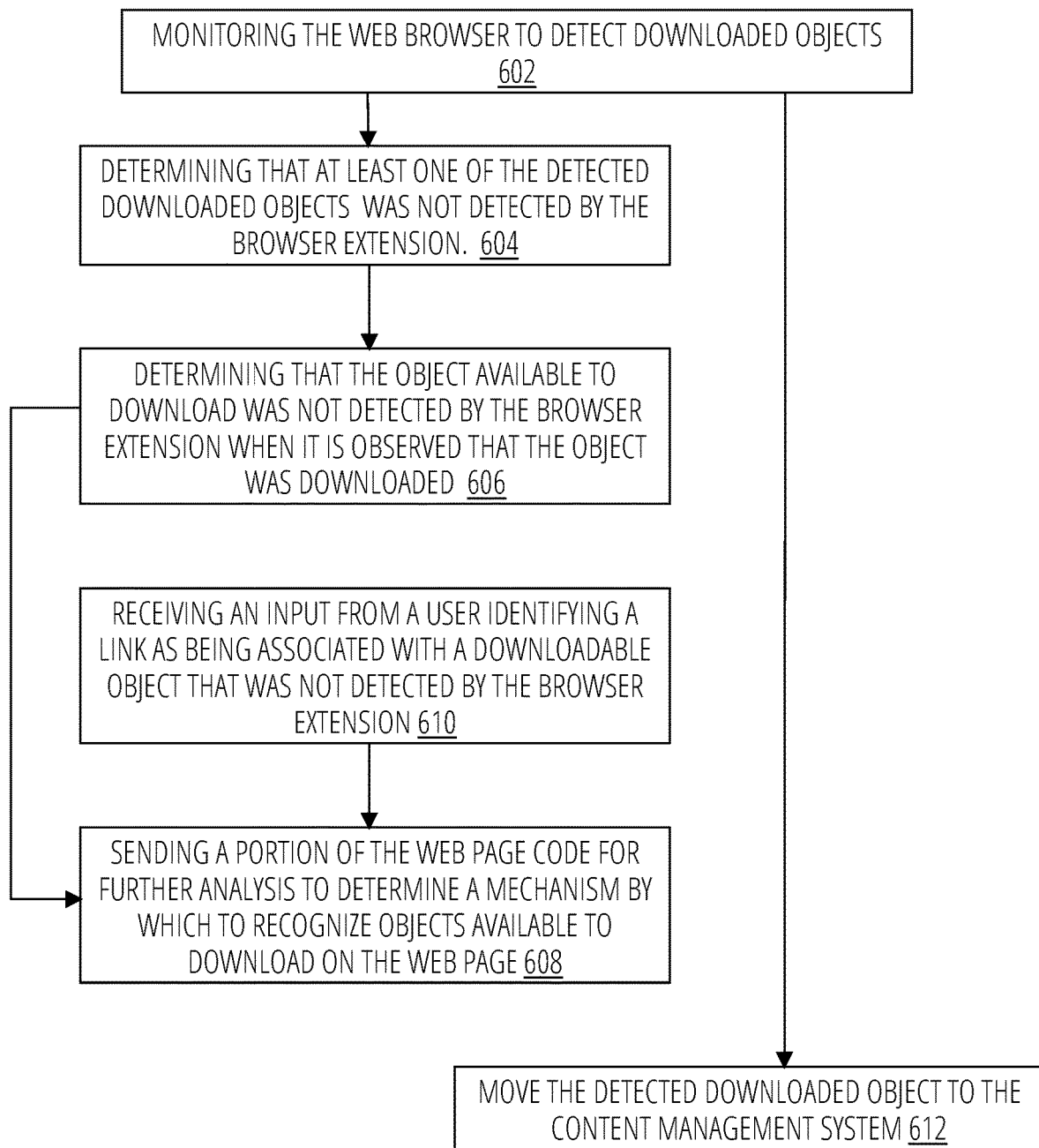
FIG. 6 illustrates an example method for determining that a web browser downloaded an object without the help of the browser extension in accordance with some aspects of the present technology.

FIG. 6 illustrates an example method for determining that a web browser downloaded an object without the help of the browser extension. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

In some embodiments, the method includes monitoring the web browser to detect downloaded objects at block 602. For example, the browser extension 144 illustrated in FIG. 1 monitors the web browser to detect downloaded objects.

It is relevant to the browser extension 144 to identify that the web browser is performing a download that was not mediated by the browser extension 144 so that the browser extension 144 can take additional steps to assist the user and/or to provide data from which the browser extension 144 can improve its ability to recognize links associated with downloadable objects. For example, it may have been more convenient, at least for the initial step, for the user to click on the link of the webpage without going through the browser extension 144, but if the user desires to store the downloaded object in the content management system 102, the browser extension 144 can assist with moving the downloaded object from a generic system download folder on the client device 134 to a location in the content management system 102. In another example, the browser extension 144 might not have recognized the link used to download the object as being associated with an object available to download. In such examples, the browser extension 144 can be configured to analyze the webpage to better identify links on the webpage that are associated with downloadable objects.

In some embodiments, the method includes moving the detected downloaded object to the content management system at block 612. For example, the browser extension 144 illustrated in FIG. 1 can move the detected downloaded object to the content management system. In some examples, the browser extension 144 can provide a prompt or question to the user through a user interface popup or overlay to allow the user to move the downloaded object to the content management system 102. An example user interface to provide the user with an option to move the object is illustrated in FIG. 10. If the user desires to move the downloaded object to the content management system 102, the user can interact with the browser extension 144 to select a location within the content management system 102 to move the downloaded object. The browser extension 144 can move or copy the downloaded object to the content management system 102 on behalf of the user.

Whether or not the user decides to move the downloaded object, the browser extension 144 may also want to analyze the webpage to learn how to identify a link that pointed to the downloaded object if the browser extension 144 failed to detect it.

In some embodiments, the method includes determining that at least one of the detected downloaded objects was not detected by the browser extension at block 604. For example, the browser extension 144 illustrated in FIG. 1 can determine that at least one of the detected downloaded objects was not detected by the browser extension.

The browser extension 144 can determine that it failed to detect that a link was associated with a downloadable object in several ways. In one method, the browser extension 144 can compare the object name of the downloaded object with the likely object names it detected as downloadable on the webpage. If the object name of the downloadable object is not among the likely object names the browser extension 144 detected as downloadable, then it is possible that the browser extension 144 failed to identify the particular URL as being associated with a downloadable object.

Another method of determining that a downloaded object was not detected includes determining that the object available to download was not detected by the browser extension when it is observed that the object was downloaded by at least one user at block 606. For example, the browser extension 144 illustrated in FIG. 1 can determine that it did not detect a downloaded object when it is observed that the object was downloaded through a user's interaction with a link as opposed to the browser extension 144.

Another method of determining that a downloaded object was not detected includes receiving an input from a user identifying a link as being associated with a downloadable object that was not detected by the browser extension at block 610. For example, the browser extension 144 illustrated in FIG. 1 can receive an input from a user identifying a link as being associated with a downloadable object that was not detected by the browser extension. The input can include interacting this the browser extension 144 to locate a menu to report a webpage where a downloadable object associated with a URL was not identified. An option to indicate that a particular URL was not recognized to be associated with a downloadable object could be included in a contextual menu accessible by a right click of the URL (or other interaction).

In some embodiments, the method includes sending a portion of the webpage code for further analysis to determine a mechanism to recognize objects available to download on the webpage at block 608. For example, the browser extension 144 illustrated in FIG. 1 sends a portion of the webpage code for further analysis to determine a mechanism to recognize objects available to download. The portion of the webpage code can be sent to the content management system 102 or another cloud service for further analysis to improve the browser extension 144. The analysis is an offline process, meaning that the analysis results might not be immediately available to the browser extension 144, but can be used to improve the browser extension 144 over time.

In some embodiments, the analysis of the webpage code can be aggregated to include webpages sent for analysis by several users on separate visits to the webpage or other webpages. Such activity can indicate that the browser extension 144 is not able to identify the URL associated with some properties as being associated with the downloadable object, and the browser extension can be improved for URLs associated with these properties.

In some embodiments, prior to sending the portion of the webpage for further analysis, the browser extension 144 can process the portion of the webpage to remove personally-identifying information. The browser extension 144 can also present the portion of the webpage to the user so that the user can view the data that will be sent for analysis prior to submitting the portion of the webpage for analysis.

In some examples, the mechanism to recognize the objects available to download can include sending a portion of the webpage code for further analysis to determine a pattern by which to recognize objects available to download on the webpage. When a pattern is recognized in the link, the pattern can be represented by a REGEX pattern. The REGEX pattern can be provided to the browser extension 144 to detect downloadable objects of the webpage on subsequent visits. In some embodiments, the REGEX pattern can be specific to a particular webpage and is not used on other webpages.

In some examples, the mechanism to recognize the objects available to download can include sending a portion of the webpage code to a machine learning algorithm for training to recognize the URL for the downloadable object.

In some embodiments, the browser extension 144 might learn of URLs that it failed to recognize without requiring an object to be downloaded, as in block 604. In some examples, a user might believe that additional objects should have been recognized by browser extension 144 and provide an input received by browser extension 144 instructing the plugin to do a detailed scan of the webpage to identify the objects available to download. In such embodiments, the browser extension 144 may have been configured to only perform heuristic analysis or apply a machine learning analysis to the webpage. As noted above, these methods can be more efficient than issuing HEAD or GET requests for links. However, upon receiving the request for a more detailed analysis, the browser extension 144 can perform HEAD and/or GET requests for links that were not previously determined to be associated with objects available to download. In this method, the browser extension 144 can learn of URLs it failed to identify using more efficient methods and send the portion of the webpage for analysis as described with respect to block 608. Also, the browser extension 144 can list the objects detected during the detailed scan in a user interface for download as described with respect to block 214 in FIG. 2.

Figure 7:
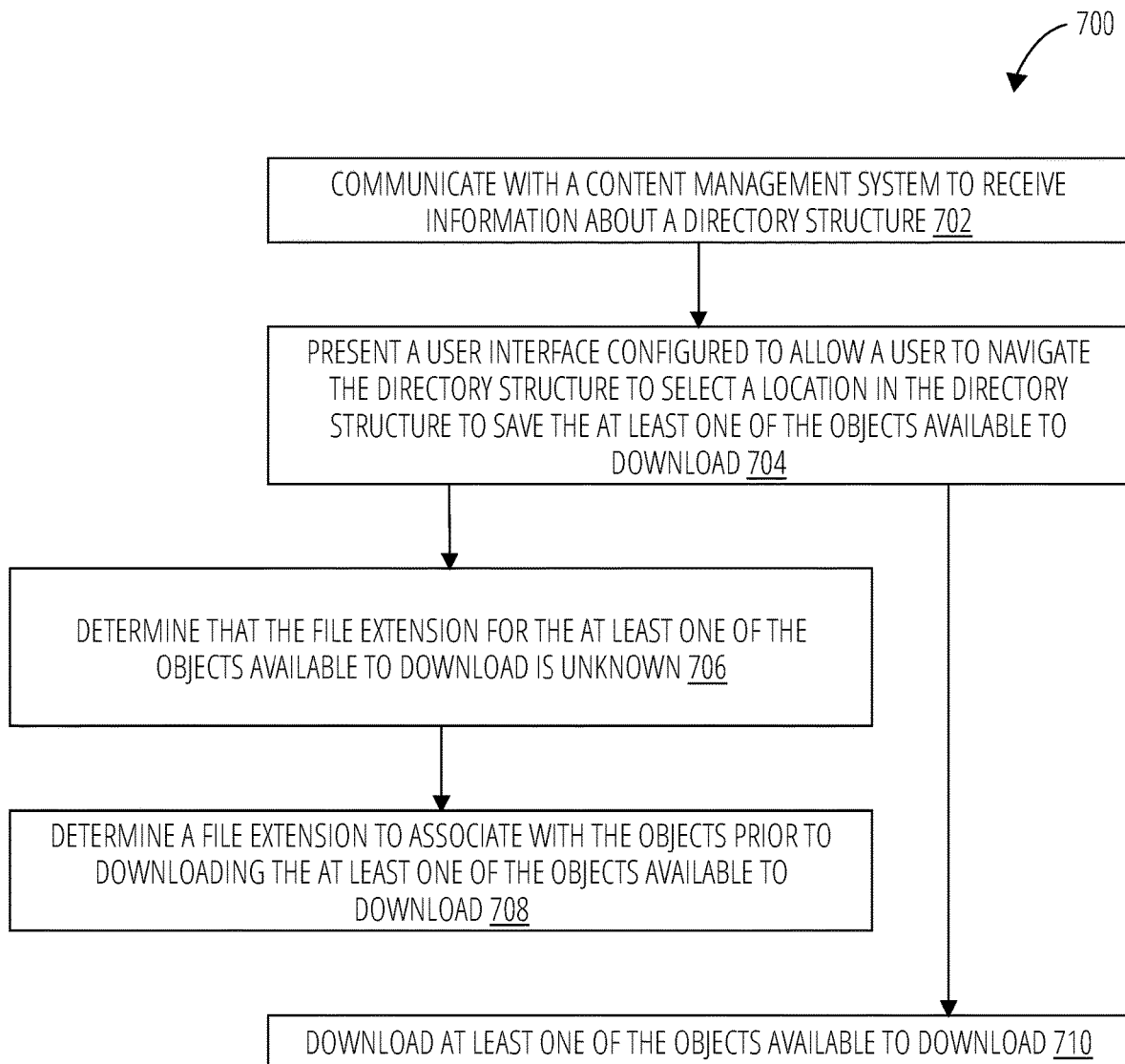
FIG. 7 illustrates an example method for selecting a location at content management system to save a downloadable object and for selecting an object name for the downloadable object in accordance with some aspects of the present technology.

FIG. 7 illustrates an example method for selecting a location at the content management system 102 to save a downloadable object and for selecting an object name for the downloadable object. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

Although the browser extension 144 might detect that a downloadable object can be downloaded, the browser extension 144 might not be able to ascertain what type of downloadable object it is. Depending on the attributes of the webpage, the browser extension 144 might be able to determine an object name and object type, or the browser extension 144 might only be able to determine that the downloadable object is an image or document, but not what type of file extension should be associated with the image or document, or the browser extension 144 might be able to determine that an object probably can be downloaded, but nothing else about the object.

In instances where incomplete information is known, the browser extension 144 provides an interface to allow the user to provide additional information about the downloadable objects. Additionally, the browser extension 144 can provide an interface to allow a user to make selections regarding where a downloadable object should be stored within the content management system.

In some embodiments, the method includes communicating with the content management system to receive information about a directory structure at block 702. For example, the browser extension 144 illustrated in FIG. 1 communicates with the content management system to receive information about a directory structure.

In some embodiments, the method includes presenting a user interface configured to allow a user to navigate the directory structure to select a location in the directory structure to save the at least one of the objects available to download at block 704. For example, the browser extension 144 illustrated in FIG. 1 presents a user interface configured to allow a user to navigate the directory structure to select a location in the directory structure to save at least one of the objects available to download. The browser extension 144 can receive inputs effective to navigate the directory structure and receive a selection of a particular directory to store a downloadable object. In some embodiments, the user can select one directory to store several downloadable objects at once. In some embodiments, the user can select a different directory for each object and the browser extension 144 can download the downloadable objects to their respective chosen directories.

In some embodiments, the method includes determining that the file extension for at least one of the objects available to download is unknown at block 706. For example, the browser extension 144 illustrated in FIG. 1 can determine that the file extension for at least one of the objects available to download is unknown.

In some embodiments, when the file extension is unknown the method includes determining a file extension to associate with the object prior to downloading at least one of the objects available to download at block 708. For example, the browser extension 144 illustrated in FIG. 1 can determine a file extension to associate with the object prior to downloading at least one of the objects available to download. In some examples, the browser extension 144 can initiate a HEAD request or a GET request that is limited to a range of bytes to attempt to determine the proper file extension. In some examples, the browser extension 144 can provide a user interface to allow the user to select the file extension. The browser extension 144 can receive a selected file extension and associate it with the object name when downloading the object.

In some embodiments, the method includes downloading at least one of the objects available to download at block 710. For example, the browser extension 144 illustrated in FIG. 1 downloads at least one of the objects available to download to a directory in the content management system 102 selected by the user as described with respect to block 704, and any file extension selected by the user or determined by browser extension 144 as described with respect to block 708.

Figure 8:
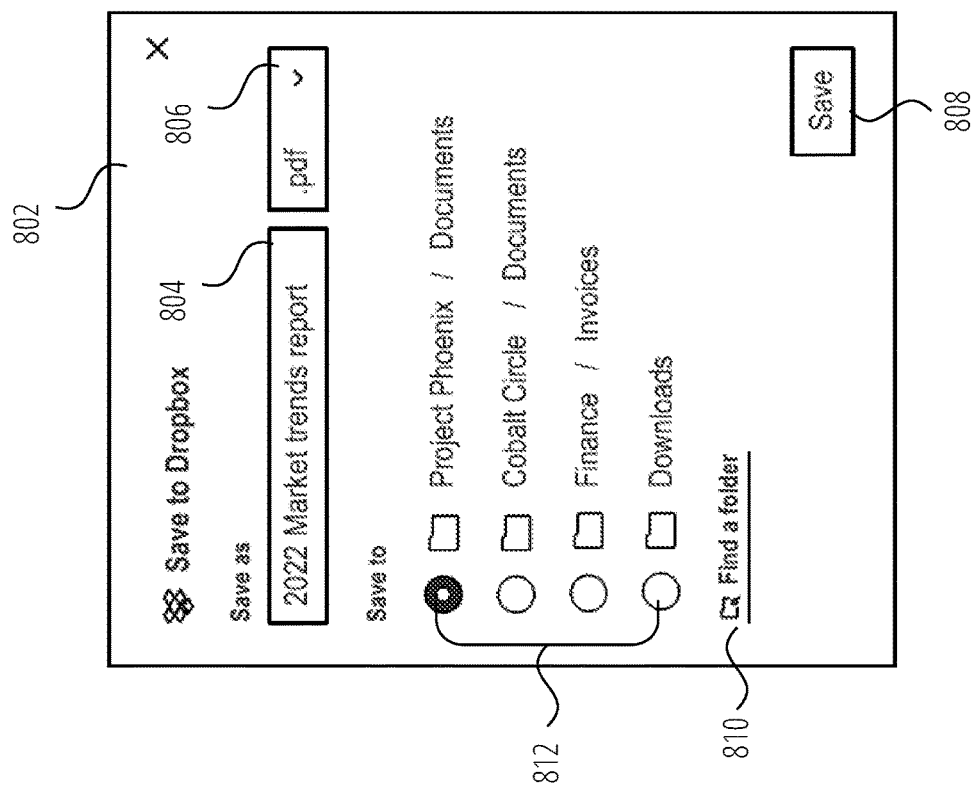
FIG. 8 illustrates an example object save interface in accordance with some aspects of the present technology.

FIG. 8 illustrates an example object save interface 802. The object save interface 802 may be displayed after the user has selected downloadable objects and proceeds to the next step (such as when the user selects the next button 312 in FIG. 3A or the save button 310 in FIG. 3B). The object save interface 802 can include an object name input interface 804 which the user can use to customize the name of a downloadable object, and can include an extension selector 806. The extension selector 806 can be prepopulated with an extension when the extension has been determined by the browser extension. However, the extension selector 806 may be blank when the browser extension is unable to determine a likely extension for the downloadable object. The object save interface 802 can also include a collection of recent folders 812 as well as a search folders option 810 that a user can select when the desired folder is not represented in the collection of recent folders 812. The interface illustrated in FIG. 8 has the benefit of allowing a user to store downloaded objects to a cloud instance of a content management system without first downloading the objects to a local folder and then transferring them into the content management system. Additionally, a user can select a single location to download all of the objects to be downloaded.

FIG. 8 illustrates object name input interface 804 and extension selector 806 that is able to name the object and add an extension to the object. In instances where multiple objects require an extension to be selected the object save interface 802 can be expanded to allow the user to edit the object name and extension for each object. In some embodiments, when there are many object, the object save interface 802 might only show objects for which an extension is not known.

FIG. 9 illustrates another example a webpage 906. The browser extension has evaluated webpage 906 and identified the downloadable object 904. The browser extension has indicated that it has detected the downloadable object 904 with a recognized object icon 902.

A user can interact with the recognized object icon 902 to download the individual downloadable object. After selecting the recognized object icon 902, the browser extension 144 can present the user with an interface to select a location within the content management system to save the object. For example, the interface to select a location within the content management system to save the object can be the object save interface 802 illustrated in FIG. 8.

A user can also interact with the browser extension 144 directly to see downloadable object 904 and other downloadable objects recognized on webpage 906 in an interface such as browser extension overlay 306 illustrated in FIG. 3A.

FIG. 10 illustrates another example of webpage 314 wherein a user has selected a downloadable object to be downloaded directly through interacting with a link on the webpage. In such an instance, the downloadable object can be downloaded directly to the client device on which the webpage is rendered, and the browser extension can detect that the downloadable object has been downloaded. FIG. 10 illustrates an example move interface 1002 that can be presented by the browser extension after it has detected that the downloadable object has been downloaded directly to the client device. The example move interface 1002 can provide a move button 1004 to easily move or copy the downloadable object to the content management system. In some embodiments, after the selection of the move button 1004, the browser extension can present an interface similar to that shown in FIG. 8 to allow the user to select a location within the content management system to move the downloadable object.

Figure 11:
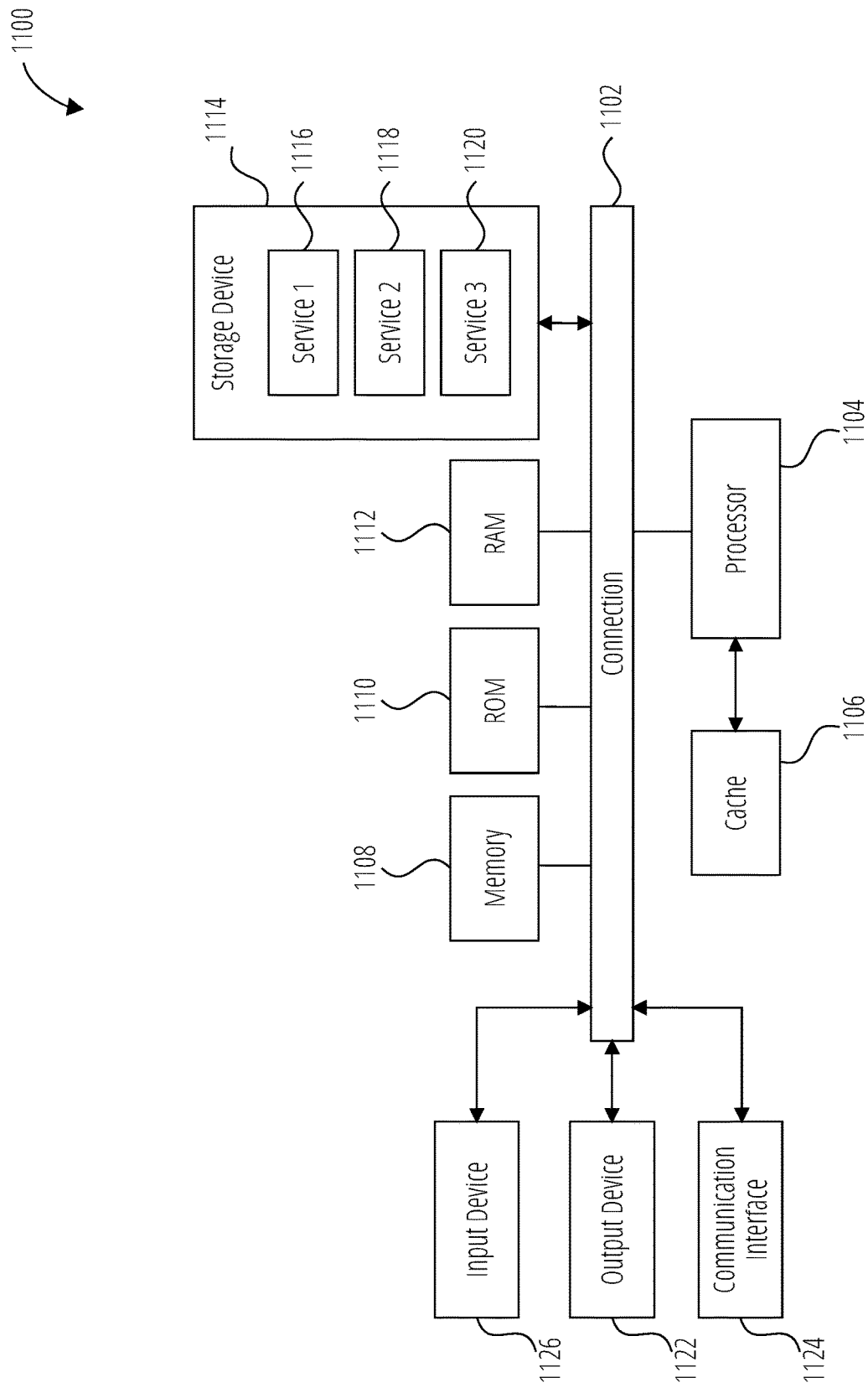
FIG. 11 shows an example of a system for implementing certain aspects of the present technology.

FIG. 11 shows an example of computing system 1100, which can be for example any computing device making up browser extension 144 or content management system 102 or client devices 134, or any component thereof in which the components of the system are in communication with each other using connection 1102. Connection 1102 can be a physical connection via a bus, or a direct connection into processor 1104, such as in a chipset architecture. Connection 1102 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1100 includes at least one processing unit (CPU or processor) 1104 and connection 1102 that couples various system components including system memory 1108, such as read-only memory (ROM) 1110 and random access memory (RAM) 1112 to processor 1104. Computing system 1100 can include a cache of high-speed memory 1106 connected directly with, in close proximity to, or integrated as part of processor 1104.

Processor 1104 can include any general purpose processor and a hardware service or software service, such as services 1116, 1118, and 1120 stored in storage device 1114, configured to control processor 1104 as well as a special-purpose processor where software instructions are incorporated into the actual processor design. Processor 1104 may essentially be a completely self-contained computing system, containing multiple cores or processors, a bus, memory controller, cache, etc. A multi-core processor may be symmetric or asymmetric.

To enable user interaction, computing system 1100 includes an input device 1126, which can represent any number of input mechanisms, such as a microphone for speech, a touch-sensitive screen for gesture or graphical input, keyboard, mouse, motion input, speech, etc. Computing system 1100 can also include output device 1122, which can be one or more of a number of output mechanisms known to those of skill in the art. In some instances, multimodal systems can enable a user to provide multiple types of input/output to communicate with computing system 1100. Computing system 1100 can include communication interface 1124, which can generally govern and manage the user input and system output. There is no restriction on operating on any particular hardware arrangement, and therefore the basic features here may easily be substituted for improved hardware or firmware arrangements as they are developed.

Storage device 1114 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1114 can include software services, servers, services, etc., that when the code that defines such software is executed by the processor 1104, it causes the system to perform a function. In some embodiments, a hardware service that performs a particular function can include the software component stored in a computer-readable medium in connection with the necessary hardware components, such as processor 1104, connection 1102, output device 1122, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method of automatically identifying objects available to download on a webpage, the method comprising: executing a browser extension, the browser extension associated with a content management system; detecting a webpage rendered in the web browser by the browser extension; automatically inspecting the webpage to find the objects available to download to which uniform resource locators (URLs) are provided on the webpage, the automatic inspection is performed by a browser extension; and detecting the objects available to download on the webpage by the browser extension.

Aspect 2. The method of Aspect 1, further comprising: causing a user interface overlay to be presented over the webpage rendered in the web browser, the user interface overlay includes a list of the objects detected on the webpage by the browser extension.

Aspect 3. The method of any of Aspects 1 to 2, further comprising: receiving a selection of at least one of the objects available to download on the webpage listed in the browser extension, the selection of the at least one object from the list in the browser extension indicating that a user desires to download the at least one of the objects that have been selected.

Aspect 4. The method of any of Aspects 1 to 3, wherein the selection of at least one of the objects available to download on the webpage listed in the browser extension is a selection of a plurality of the objects available to download on the webpage.

Aspect 5. The method of any of Aspects 1 to 4, further comprising: receiving a selection of an icon representing the browser extension prior to the causing the user interface overlay to be presented over the webpage.

Aspect 6. The method of any of Aspects 1 to 5, further comprising: detecting a selection of a link to download an object, wherein the selection results in a presentation of a contextual menu that includes an option to present the user interface overlay that includes the list of objects available to download on the webpage, wherein the selection of the link to download the object refers to a first object that is among the objects detected on the webpage by the browser extension.

Aspect 7. The method of any of Aspects 1 to 6, further comprising: providing a sort or filter option to sort or filter the list of the objects detected on the webpage by the browser extension.

Aspect 8. The method of any of Aspects 1 to 7, wherein the automatically inspecting the webpage to find the objects available to download occurs before a user selects one of the links on the webpage.

Aspect 9. The method of any of Aspects 1 to 8, wherein the objects available to download include at least one portable document format (.pdf) or a word processing document.

Aspect 10. The method of any of Aspects 1 to 9, wherein the detecting the objects available to download on the webpage further comprises: parsing a document object model (DOM) of the webpage; identifying a plurality of the URLs that satisfy at least one criterion from a plurality of criteria, the URLs that satisfy the at least one criterion.

Aspect 11. The method of any of Aspects 1 to 10, wherein the at least one criterion is that the URL is associated with an anchor tag having an attribute that corresponds to an object available to download.

Aspect 12. The method of any of Aspects 1 to 11, further comprising: providing for display a visual indication that the URL that corresponds to one of the objects available to download.

Aspect 13. The method of any of Aspects 1 to 12, wherein the detecting the objects available to download on the webpage further comprises: inputting segments of the parsed DOM into a machine learning algorithm; receiving an output of a classification for the plurality of URLs indicating that they are associated with one of the objects available to download.

Aspect 14. The method of any of Aspects 1 to 13, wherein the detecting the objects available to download on the webpage further comprises: sending a HEAD request for a first URL of the URLs provided on the webpage; determining that the header returned from the HEAD request is consistent with an object available for download.

Aspect 15. The method of any of Aspects 1 to 14, wherein the detecting the objects available to download on the webpage further comprises: sending a GET request for first URL of the URLs provided on the webpage, wherein the GET request specifies a content length; determining that bytes of an object returned in response to the GET request is consistent with an object available for download.

Aspect 16. The method of any of Aspects 1 to 15, further comprising: determining that an object available to download was not detected by the browser extension.

Aspect 17. The method of any of Aspects 1 to 16, further comprising: sending a portion of the webpage code for further analysis to determine a pattern by which to recognize objects available to download on the webpage.

Aspect 18. The method of any of Aspects 1 to 17, wherein the pattern can be represented by a REGEX pattern that corresponds to the URL string.

Aspect 19. The method of any of Aspects 1 to 18, further comprising: providing the portion of the webpage code to a machine learning algorithm for training to recognize the URL for the downloadable object.

Aspect 20. The method of any of Aspects 1 to 19, wherein the determining that the object available to download was not detected by the browser extension when it is observed that the object was downloaded by several users.

Aspect 21. The method of any of Aspects 1 to 20, further comprising: receiving an input from a user identifying object available to download was not detected by the browser extension.

Aspect 22. The method of any of Aspects 1 to 21, further comprising: processing the portion of the webpage to remove personally identifying information.

Aspect 23. The method of any of Aspects 1 to 22, further comprising: presenting the portion of the webpage to the user prior to submitting the portion of the webpage for analysis.

Aspect 24. The method of any of Aspects 1 to 23, further comprising: monitoring the web browser to detect downloaded objects; determining that at least one of the detected downloaded objects was not detected by the browser extension.

Aspect 25. The method of any of Aspects 1 to 24, wherein the detecting the objects available to download on the webpage further comprises: detecting that the URL string matches a REGEX pattern that corresponds to objects that have been observed to be downloadable.

Aspect 26. The method of any of Aspects 1 to 25, further comprising: receiving a user input instructing the plugin to do a detailed scan of the webpage to identify the objects available to download; sending a HEAD request or a GET request for links that are not initially detected to be associated with the objects available for download.

Aspect 27. The method of any of Aspects 1 to 26, further comprising: downloading at least one of the objects available to download.

Aspect 28. The method of any of Aspects 1 to 27, further comprising: prior to downloading the at least one of the objects available to download, determining that it is not possible to determine an object extension for the at least one of the objects available to download from the inspection of the webpage; determining an object extension to associate with the object prior to downloading the at least one of the objects available to download.

Aspect 29. The method of any of Aspects 1 to 28, further comprising: communicating with a content management system to receiving information about a directory structure; presenting a user interface configured to allow a user to navigate the directory structure to select a location in the directory structure to save the at least one of the objects available to download.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of identifying objects available to download on a webpage, the method comprising:
executing a browser extension, the browser extension configured to store content on a content management system;
detecting, by the browser extension, a webpage rendered in a web browser;
inspecting the webpage, by the browser extension, to identify potential objects available to download, wherein the potential objects available to download are provided uniform resource locators (URLs) on the webpage; and
determining, based on the inspecting the webpage, objects available to download on the webpage by:
parsing a document object model (DOM) of the webpage;
inputting segments of the parsed DOM into a machine learning algorithm; and
receiving an output of a classification for a plurality of URLs indicating that they are associated with one of the objects available to download.

2. The method of claim 1, further comprising:
causing a user interface overlay to be presented over the webpage rendered in the web browser, the user interface overlay comprising a list of the objects detected on the webpage by the browser extension.

3. The method of claim 1, wherein the determining the objects available to download on the webpage further comprises:
identifying a URL of the plurality of the URLs for which the DOM satisfies a criterion of the URL being associated with an anchor tag having an attribute that corresponds to an object available to download.

4. The method of claim 1, further comprising:
monitoring the web browser to detect whether an object that is downloaded from the webpage was not one of the identified potential objects available to download; and
sending, for further analysis, a portion of code of the webpage that corresponds to the object that is downloaded from the webpage to improve an ability of the browser extension to inspect the webpage to identify the potential objects available to download.

5. The method of claim 1, further comprising:
receiving a user input instructing the browser extension to do a detailed scan of the webpage to identify the objects available to download; and
sending a HEAD request or a GET request for links that are not initially determined to be associated with the objects available for download.

6. The method of claim 1, further comprising:
determining whether it is possible to determine a file extension for an object of the objects available to download; and
when the file extension cannot be determined for the object of the objects available to download, assigning a file extension to associate with the object prior to downloading the object.

7. The method of claim 1, wherein the inspecting of the webpage to identify the potential objects available to download further comprises:
identifying the potential objects available to download based, at least in part, on analyzing additional information to file extensions, the additional information being in and/or surrounding the URLs provided on the webpage.

8. A method of identifying objects available to download on a webpage, the method comprising:
executing a browser extension, the browser extension configured to store content on a content management system;
detecting, by the browser extension, a webpage rendered in a web browser;
inspecting the webpage, by the browser extension, to identify potential objects available to download, wherein the potential objects available to download are provided uniform resource locators (URLs) on the webpage; and
determining, based on the inspecting the webpage, objects available to download on the webpage by;
either sending a HEAD request for a first URL of the URLs provided on the webpage;
and determining that a header returned from the HEAD request is consistent with an object available for download; or
sending a GET request for the first URL of the URLs provided on the webpage, wherein the GET request specifies a number of bytes to be returned in response to the GET request and determining that bytes of an object returned in response to the GET request is consistent with an object available for download.

9. The method of claim 8, wherein, when sending the HEAD request, the method further comprises:
determining that a header returned from the HEAD request is consistent with an object available for download.

10. The method of claim 8, further comprising:
causing a user interface overlay to be presented over the webpage rendered in the web browser, the user interface overlay comprising a list of the objects detected on the webpage by the browser extension.

11. The method of claim 8, further comprising:
monitoring the web browser to detect whether an object that is downloaded from the webpage was not one of the identified potential objects available to download; and
sending, for further analysis, a portion of code of the webpage that corresponds to the object that is downloaded from the webpage to improve an ability of the browser extension to inspect the webpage to identify the potential objects available to download.

12. The method of claim 8, further comprising:
- determining whether it is possible to determine a file extension for an object of the objects available to download; and
- when the file extension cannot be determined for the object of the objects available to download, assigning a file extension to associate with the object prior to downloading the object.

13. A system comprising:
- a processor; and
- a memory storing instructions that, when executed by the processor, configure the system to:
- execute a browser extension, the browser extension configured to store content on a content management system;
- detect, by the browser extension, a webpage rendered in a web browser;
- inspect the webpage, by the browser extension, to identify potential objects available to download, wherein the potential objects available to download are provided uniform resource locators (URLs) on the webpage; and
- determine, based on the inspection of the webpage, objects available to download on the webpage by:
  - parsing a document object model (DOM) of the webpage;
  - inputting segments of the parsed DOM into a machine learning algorithm; and
  - receiving an output of a classification for a plurality of URLs indicating that they are associated with one of the objects available to download.

14. The system of claim 13, wherein the instructions further configure the system to:
- cause a user interface overlay to be presented over the webpage rendered in the web browser, the user interface overlay comprising a list of the objects detected on the webpage by the browser extension.

15. The system of claim 13, wherein the determination of the objects available to download on the webpage further comprises:
- identifying a URL of the plurality of the URLs for which the DOM satisfies a criterion of the URL being associated with an anchor tag having an attribute that corresponds to an object available to download.

16. The system of claim 13, wherein the inspection of the webpage to identify the potential objects available to download further comprises:
- identifying the potential objects available to download based, at least in part, on analyzing additional information to file extensions, the additional information being in and/or surrounding the URLs provided on the webpage.

17. The system of claim 13, wherein the instructions further configure the system to:
- monitor the web browser to detect whether an object that is downloaded from the webpage was not one of the identified potential objects available to download; and
- send, for further analysis, a portion of code of the webpage that corresponds to the object that is downloaded from the webpage to improve an ability of the browser extension to inspect the webpage to identify the potential objects available to download.

18. The system of claim 13, wherein the instructions further configure the system to:
- receive a user input instructing the browser extension to do a detailed scan of the webpage to identify the objects available to download; and
- send a HEAD request or a GET request for links that are not initially determined to be associated with the objects available for download.

19. The system of claim 13, wherein the instructions further configure the system to:
- determine whether it is possible to determine a file extension for an object of the objects available to download; and
- when the file extension cannot be determined for the object of the objects available to download, assigning a file extension to associate with the object prior to downloading the object.

\* \* \* \* \*